(12) United States Patent
Manville et al.

(10) Patent No.: US 11,568,896 B2
(45) Date of Patent: Jan. 31, 2023

(54) SYNCHRONIZING EDITS TO DIGITAL CONTENT ITEMS

(71) Applicant: DROPBOX, INC., San Francisco, CA (US)

(72) Inventors: Thomas Manville, Mountain View, CA (US); Digant Kasundra, Alameda, CA (US)

(73) Assignee: Dropbox, Inc., San Francisco, CA (US)

( * ) Notice: Subject to any disclaimer, the term of this patent is extended or adjusted under 35 U.S.C. 154(b) by 155 days.

(21) Appl. No.: 16/513,577

(22) Filed: Jul. 16, 2019

(65) Prior Publication Data

US 2019/0341079 A1    Nov. 7, 2019

Related U.S. Application Data

(63) Continuation of application No. 15/169,337, filed on May 31, 2016, now Pat. No. 10,388,324.

(51) Int. Cl.
*H04N 21/854* (2011.01)
*G11B 27/031* (2006.01)
*H04N 21/2343* (2011.01)
*H04N 21/24* (2011.01)

(52) U.S. Cl.
CPC ..... *G11B 27/031* (2013.01); *H04N 21/23439* (2013.01); *H04N 21/2402* (2013.01); *H04N 21/854* (2013.01)

(58) Field of Classification Search
CPC .............. G11B 27/031; G11B 27/32; H04N 21/23439; H04N 21/2402; H04N 21/854
See application file for complete search history.

(56) References Cited

U.S. PATENT DOCUMENTS

| | | | |
|---|---|---|---|
| 7,424,202 B2 | 9/2008 | Nakamura et al. | |
| 8,768,142 B1 | 7/2014 | Ju et al. | |
| 9,032,297 B2 | 5/2015 | Lovejoy et al. | |
| 9,110,572 B2 | 8/2015 | Gerhardt et al. | |
| 9,251,131 B2* | 2/2016 | McCabe | G06Q 10/10 |
| 2002/0073146 A1* | 6/2002 | Bauer | G06F 9/5055 |
| | | | 709/203 |
| 2002/0145622 A1* | 10/2002 | Kauffman | H04N 5/222 |
| | | | 715/723 |
| 2005/0025454 A1 | 2/2005 | Nakamura et al. | |

(Continued)

OTHER PUBLICATIONS

U.S. Appl. No. 15/169,337, Apr. 6, 2018, Office Action.
U.S. Appl. No. 15/169,337, Jan. 25, 2019, Office Action.
U.S. Appl. No. 15/169,337, Apr. 16, 2019, Notice of Allowance.

*Primary Examiner* — Andrey Belousov
(74) *Attorney, Agent, or Firm* — Keller Preece PLLC

(57) ABSTRACT

One or more embodiments of a video editing system enable one or more users to conveniently edit a digital video. In particular, an online content management system can provide a low resolution version of a digital video to a client device. A user can interact with the low resolution digital video and generate user edits to apply to the digital video. The online content management system can further apply any number of users edits to low and high resolution versions of the digital video at a server device. The video editing system enables users to more conveniently apply iterative edits to digital videos. Additionally, the video editing system enables multiple users to cooperatively edit a digital video from multiple client devices.

20 Claims, 9 Drawing Sheets

(56) References Cited

U.S. PATENT DOCUMENTS

| | | | |
|---|---|---|---|
| 2005/0197964 A1* | 9/2005 | Duggan | G06Q 30/06 |
| | | | 705/57 |
| 2007/0143277 A1* | 6/2007 | Van De Laar | G06F 16/9574 |
| | | | 707/999.005 |
| 2009/0083245 A1 | 3/2009 | Ayotte et al. | |
| 2011/0026898 A1 | 2/2011 | Lussier et al. | |
| 2011/0206351 A1 | 8/2011 | Givoly | |
| 2014/0330911 A1* | 11/2014 | Hunter | H04L 51/16 |
| | | | 709/206 |
| 2015/0281305 A1 | 10/2015 | Sievert et al. | |
| 2017/0345459 A1 | 11/2017 | Manville et al. | |

* cited by examiner

SYNCHRONIZING EDITS TO DIGITAL CONTENT ITEMS

CROSS-REFERENCE TO RELATED APPLICATIONS

The present application is a continuation of U.S. application Ser. No. 15/169,337, filed on May 31, 2016. The aforementioned application is hereby incorporated by reference in its entirety.

BACKGROUND

1. Technical Field

One or more embodiments of the present disclosure relate to editing digital content. More specifically, one or more embodiments disclosed herein relate to systems and methods for receiving and applying user edits to a digital video.

2. Background and Relevant Art

Computing devices (e.g., computers, tablets, smart phones) provide numerous ways for people to capture, store, create, share, view, and otherwise interact with digital content. For example, many computing devices enable users to store and edit digital videos. Over time, a user of a computing device can collect a large amount of digital content. As a result, it can be difficult for a user to experience and interact with digital content in an efficient and enjoyable manner.

For example, many conventional systems and devices lack the storage and processing capabilities to enable computing device to conveniently store and edit higher resolution video files and/or lossless images. In particular, as the quality of digital video continues to improve, the size of higher resolution and/or lossless digital video files also increases and often becomes burdensome to store and manage high resolution digital video files on computing devices. Furthermore, the foregoing drawbacks are exacerbated with mobile devices that have limited storage and processing capabilities.

Additionally, conventional systems for storing and/or editing digital videos often fail to provide a practical and economic way for multiple users to collaborate and apply cooperative edits to a digital video file. For example, video editing software is often expensive and prohibitive to provide to multiple users and/or multiple computing devices. Additionally, where several users and devices utilize different programs for editing digital videos, interacting with a digital video file using devices having different editing features and functionality fails to enable multiple users to synchronize or otherwise coordinate edits for a particular digital video file.

Furthermore, applying edits to digital video and other digital content using conventional systems and devices is often time consuming. For example, many users apply multiple changes to a digital video or other digital content by applying individual changes to the digital content over time. In particular, users often apply individual edits by generating one or more new copies of a digital video with each individual change. As a result, rendering or otherwise applying edits to high resolution and/or lossless digital videos is often time consuming and can become a frustrating or burdensome process.

Accordingly, there are a number of considerations to be made in generating and applying user edits to digital videos.

SUMMARY

Embodiments of the present disclosure provide benefits and/or solve one or more of the foregoing or other problems in the art with systems and methods for applying user edits to a digital video. In particular, systems and methods described herein enable users to edit a digital video using one or more client devices having limited processing capabilities. For example, systems and methods described herein include features and functionality that enable a user to interact with a low resolution version of a digital video on a client device and generate user edits to apply to a high resolution version of the digital video on a remote device. The systems and methods further involve applying, by the remote device, one or more user edits to low and/or high resolution versions of a digital video. Thus, the systems and methods described herein enable a user to store and edit high resolution digital video files notwithstanding limited processing capabilities of a client device.

Moreover, systems and methods described herein include features and functionality that enable a user to more conveniently and efficiently apply one or multiple iterations of user edits to a high resolution digital video. For example, as mentioned above, systems and methods described herein include features and functionality to enable a user to interact with a low resolution version of a digital video on a client device and generate user edits to apply to the digital video. Systems and methods described herein further include applying the user edits to a low resolution version of the digital video and providing a revised low resolution version of the digital video to a user to enable further user edits and/or verification of the user edits for the digital video. Upon review of the revised low resolution version of the digital video, the systems and methods described herein further enable a user to apply any number of user edits to a high resolution version of the digital video.

Further, systems and methods described herein include features and functionality that enable multiple users to interact with and cooperatively edit a digital video. For example, systems and methods described herein involve applying the user edits from multiple users to low and/or high resolution versions of the digital video. Thus, the systems and methods described herein enable multiple users to interact with and coordinate user edits to apply to high resolution digital video files.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

DETAILED DESCRIPTION

Figure 1:
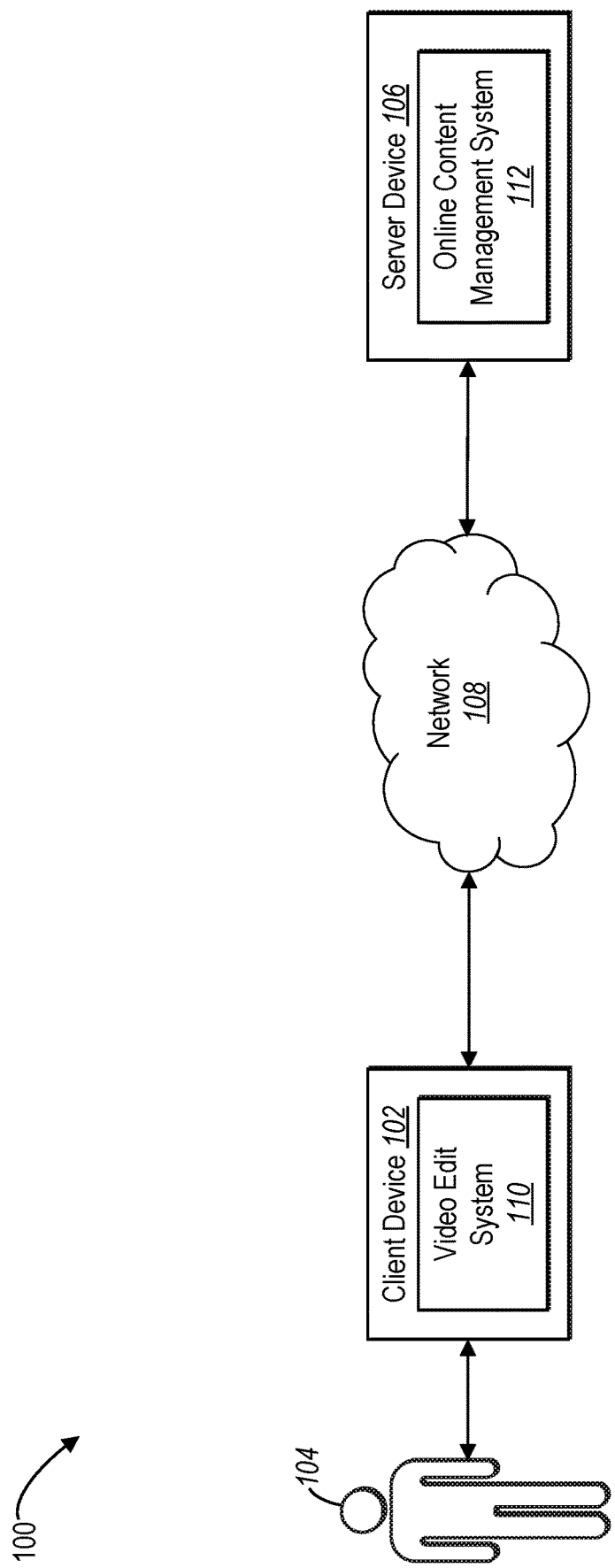
FIG. 1 illustrates a block diagram of an example environment for implementing a video editing system in accordance with one or more embodiments.

The present disclosure provides one or more embodiments of a video editing system that enables one or more users to edit a digital video. In particular, the video editing system generally enables one or more users to interact with a low resolution version of a digital video at a client device. The video editing system further enables a user to generate user edits that are applied to a high resolution version of the digital video by an online content management system at a server device. For example, the video editing system provides a low resolution version of a digital video to a user (or multiple users) while maintaining high and low resolution versions of the digital video at the online content management system. The video editing system further enables the user to edit the low resolution version and send a workflow to the online content management system including the user edits to apply to low and/or high resolution versions of the digital video maintained at the online content management system. Upon receiving the workflow, the online content management system generates revised versions of the digital video including the user edits generated by the user at the client device.

Furthermore, the video editing system enables a user to more conveniently apply iterative user edits to a digital video by selectively applying user edits to a low resolution version of the digital video and/or high resolution version of the digital video. For example, as mentioned above, the online content management system can provide a low resolution version of the digital video to a client device. A user can generate user edits for the low resolution version of the digital video and issue a low resolution render command to render a low resolution version of the digital video with the user edits at the online content management system. As used herein, a "low resolution render command" can refer to instructions for a computing device to render a low resolution version of a digital video with user edits. Further, upon reviewing the user edits or making additional edits, the user can issue a high resolution render command to render a high resolution version of the digital video with one or multiple user edits (e.g., to various low resolution versions of the digital video) at the online content management system. As used herein a "high resolution render command" can refer to instructions for a computing device to render a high resolution version of a digital video with one or more user edits.

In addition, the video editing system enables multiple users to interact with and cooperatively edit a digital video by providing low resolution versions of the digital video to multiple devices and applying user edits to the different low resolution versions at the online content management system. For example, the online content management system can provide a first low resolution version of a digital video to a first client device and a second low resolution version of the digital video to a second client device. Users associated with each of the client devices can interact with respective low resolution versions of the digital video to generate a workflow with user edits to send to the online content management system. Upon receiving the workflows including the user edits, the online content management system can apply user edits from each of the workflows to a high resolution version of the digital video.

One or more embodiments of the video editing system enables a user to locally apply edits to a high resolution version of a digital video while preserving storage and processing resources of a local client device. For example, in one or more embodiments, a server provides an interface that enables the user to interact with a low resolution version of the digital video presented on the local device and subsequently apply user edits to a high resolution version of the video stored at the server. In this way, a user can indicate changes to apply to a high resolution version of a digital video without downloading or storing the high resolution version on the local device. Additionally, the server can apply the user-indicated edits to the high resolution version without utilizing processing resource on the local device.

Additionally, one or more embodiments can improve an experience of a user when editing a digital video. In particular, an online content management system can apply edit to the digital video stored in a database and/or provided to one or more users (e.g., via multiple client devices). Thus, the online content management system can maintain consistency across each of the versions of a digital video that are stored on a database and/or maintained on individual client devices. In this way, a user can edit a reduced resolution digital video on a local client device without as many resources as would be required when editing a corresponding high resolution digital video but have access to an edited high resolution version of the digital video on the local client device or another device linked to the online content management system.

Further, in one or more embodiments, the video editing system enables a user to share edits and collaborate with other users without transferring high resolution videos between devices. For example, upon applying user-indicated edits to the high resolution version of the digital video at the server, the server can provide access to the updated high resolution version of the digital video to one or more other users. As such, the server can enable any number of users to access updated high and/or low resolution versions of the digital video without requiring that the client device individually transmit the high resolution version of the digital video and/or updates of the high resolution version of the digital video from client device to client device. Rather, the server can provide a source for multiple users to access versions of the digital video including applied edits indicated by one or more users.

Moreover, while one or more embodiments described herein relate specifically to enabling a user to interact with a low resolution version of a digital video to identify edits to be applied to a high resolution version of the digital video, it is appreciated that varying levels of resolution may be utilized by different devices or systems at various stages of the described processes herein. For example, as used herein, a low resolution version of a digital video and high resolution version of a digital video may simply refer to two digital videos having different resolutions including, for example, low resolution, mid-resolution, high resolution, ultra-high resolution, or other resolution levels. Thus, as used herein, a user may interact with a first resolution version (e.g., low resolution version) of a digital video to identify user edits to be applied to a second resolution version (e.g., high resolution version) of the digital video having one of many resolution levels higher than a resolution level of the first resolution version of the digital video.

Additionally, while one or more embodiments described herein relate specifically to enabling a user to interact with a low resolution version of the digital video to identify user edits to be applied to a high resolution version of the digital video, one or more embodiments described herein may similarly relate to enabling a user to interact with a lossy version of the digital video to identify user edits to be applied to a lossless (or simply less compressed) version of the digital video. For example, one or more features described with regard to interacting with a low resolution version of a digital video may similarly apply to interacting with a lossy or compressed digital video. Similarly, one or more features described with regard to applying user edits to a high resolution version of the digital video may similarly apply to rendering or applying one or more user edits to a lossless or less compressed version of the digital video (e.g., maintained at a server device). Additionally, similar to the varying levels of resolution described above, in one or more embodiments, the different versions of the digital video can refer to versions of the digital video having varying degrees of compression.

Additional features and characteristics of one or more embodiments of the video editing system are described below with respect to the Figures. For example, FIG. 1 illustrates a block diagram of an example embodiment of video editing system 100 (or simply "system 100"). In general, and as illustrated in FIG. 1, system 100 includes client device 102 that is associated with user 104. Client device 102 may communicate with server device 106 via network 108. Additionally, as shown in FIG. 1, client device 102 includes video edit system 110 and server device 106 includes online content management system 112. In one or more embodiments, client device 102 and video edit system 110 coordinate with server device 106 and online content management system 112 to perform or provide the various functions features, processes, and systems, as described in more detail below.

Generally, client device 102 includes any one of various types of computing devices. For example, client device 102 can include a mobile device (e.g., smart phone), tablet, laptop computer, desktop computer, or any other type of computing device as further explained below with reference to FIG. 7. Client device 102, server device 106, and network 108 may communicate using any communication platforms and technologies suitable for transporting data and/or communication signals, including any known communication technologies, devices, media, and protocols supportive of remote data communications, examples of which are also described below with reference to FIG. 8.

As an initial overview of one or more embodiments of system 100, online content management system 112 can maintain digital content at server device 106. In particular, online content management system 112 can receive, store, and manage access to images, documents, photos, videos, and other digital files for one or more client devices. For example, online content management system 112 can store digital videos (and other digital content) and provide access to the stored digital videos to client device 102 or other devices. In one or more embodiments, online content management system 112 provides access to low resolution and/or high resolution versions of one or more digital videos stored at server device 106. In one or more embodiments, a high resolution version of a digital video refers to an original version of a digital video (e.g., a data file resulting from capturing a digital video) while a low resolution version of the digital video refers to a lower resolution copy of the original version of the digital video. In alternative embodiments, a high resolution digital video refers to a version of a digital video that has a higher resolution than a corresponding low resolution video. Thus, a high resolution digital video can comprise a digital video that has been compressed since capture at a compression amount that is less than a compression rate at which a corresponding low resolution version of the digital video has been compressed.

In one or more embodiments, online content management system 112 provides a low resolution version of a digital video to client device 102 over network 108. In particular, online content management system 112 can provide a low resolution version of the digital video via a website or web application on client device 102. For example, in one or more embodiments, online content management system 112 provides the low resolution version of the digital video to client device 106 via a video editing user interface provided on client device 106 to enable user 104 to interact with the low resolution version of the digital video within the video editing user interface. Alternatively, online content management system 112 provides a low resolution version of the digital video via a file transfer protocol, by providing a cloud based address at which the low resolution version of the digital video can be downloaded, via an email, or via another transfer protocol. In any event, client device 106 can open, view, and edit the low resolution digital video via a video editing user interface, which in at least one embodiment is web-based (i.e., hosted by online content management system 112).

In particular, client device 102 includes video edit system 110. Upon receiving the low resolution version of the digital video, video edit system 110 provides a video editing interface that enables user 104 to interact with the low resolution version of the digital video presented at client device 102. In particular, video edit system 110 provides tools and editing functions that enable user 104 to interact with the low resolution version of the digital video and identify one or more user edits to apply to the digital video. As user 104 identifies various user edits to apply to the digital video, video edit system 110 compiles or otherwise generates a workflow including user edits to send to server device 106 over network 108.

In one or more embodiments, client device 102 provides the workflow of user edits to server device 106 to apply the user edits to various versions of the digital video. For example, online content management system 112 can apply the user edits from the workflow to a low resolution version of the digital video. Additionally, online content management system 112 can apply the user edits from the workflow to a high resolution version of the digital video. In each case, online content management system 112 can apply edits to the different versions of the digital video using a common video processing engine on server device 106 and without utilizing processing power of client device 102.

Additionally, in one or more embodiments, video editing system 100 can facilitate iterative editing of the digital video by selectively applying one or more workflows of user edits to different versions of the digital video. For example, upon generating a workflow of user edits on client device 102, video edit system 110 can provide a low resolution render command to server device 106 in addition to the workflow of user edits. In response to receiving the low resolution render command, online content management system 112 can generate a revised low resolution version of the digital video by applying the user edits of the workflow to the low resolution version of the digital video. Further, online content management system 112 can provide the revised low resolution version of the digital video to client device 102 (e.g., to be displayed in the video editing interface).

Upon receiving the revised low resolution version of the digital video, video edit system 110 can provide a display of the revised digital video including the user edits. Additionally, video edit system 110 can provide a high resolution render command to server device 106. In response to receiving the high resolution render command, online content management system 112 can apply the user edits of the workflow to the high resolution version of the digital video to generate a revised high resolution version of the digital video. In one or more embodiments, the high resolution render command instructs online content management system 112 to apply any number of user edits (e.g., multiple workflows including user edits) to all versions of the digital video including both low resolution version(s) and high resolution versions(s) of the digital video.

In addition to enabling user 104 to selectively edit different versions of the digital video, one or more embodiments of video editing system 100 enables multiple users to cooperatively edit a digital video from multiple client devices. For example, user 104 can share generated workflows or revised low resolution versions of the digital video with other users of online content management system 112. Additionally, as will be described in greater detail below, server device 106 can receive multiple workflows including user edits from respective client devices and apply user edits from multiple devices to low and high resolution versions of the digital video.

Figure 2:
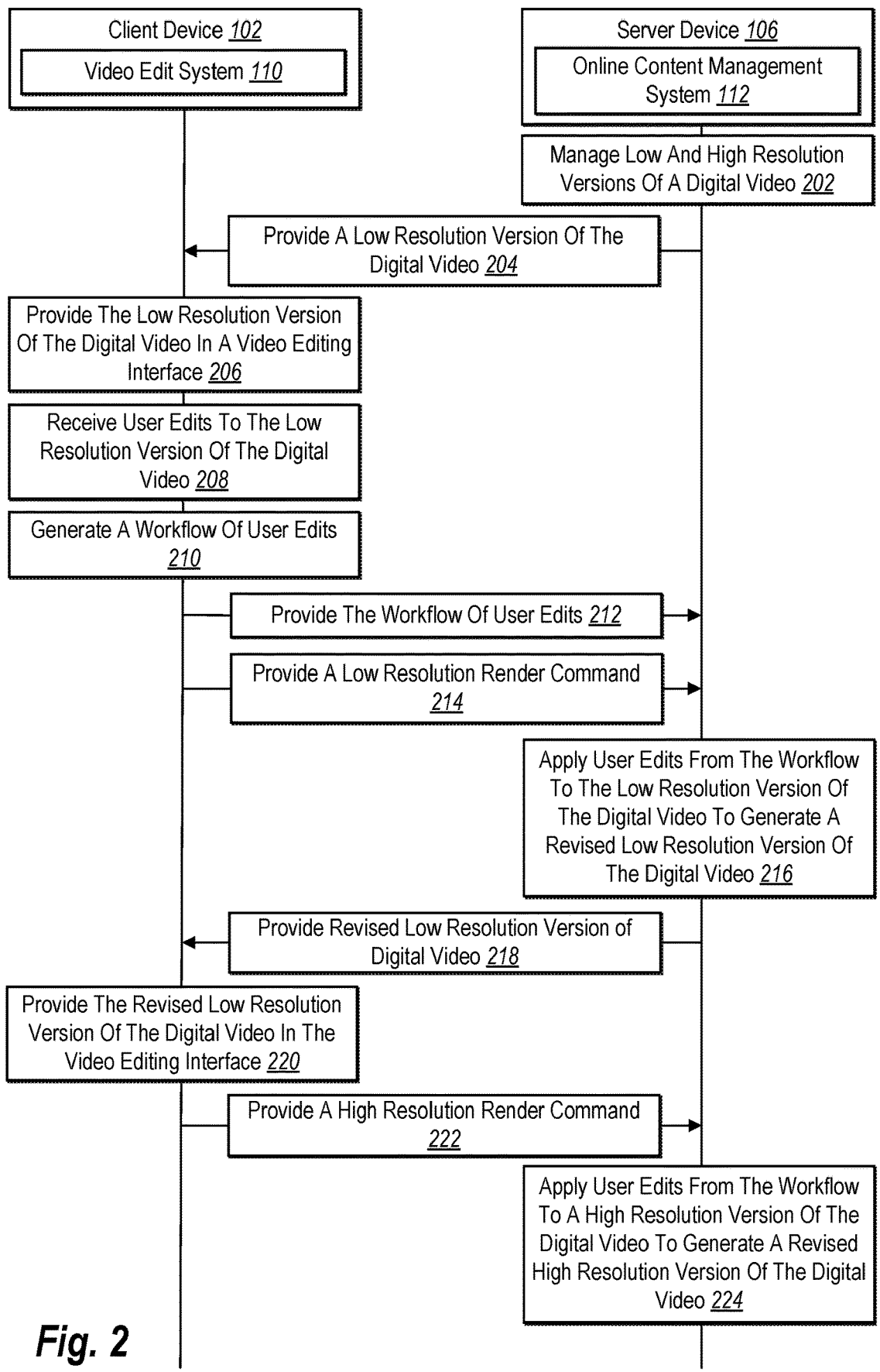
FIG. 2 illustrates a sequence diagram of interactions between a client device and a server device in accordance with one or more embodiments.

Each of components 110-112 of video editing system 100 on client device 102 and server device 106 may be in communication with one another using any suitable communication technologies. Additionally, although components 110-112 are shown as separate components on client device 102 and server device 106, one or more features and functionalities described in connection with each of components 110-112 may be combined into a single component, or divided into more components as may serve a particular embodiment. As illustrated in FIG. 2, components 110-112 may be located on, or implemented by, one or more computing devices, such as client device 102 or server device 106.

Additionally, each of components 110-112 can comprise software, hardware, or both. For example, each of components 110-112 can comprise one or more instructions stored on a computer-readable storage medium and one or more processors of one or more computing devices to execute instructions. When executed by the one or more processors, the computer-executable instructions cause a computing device to perform the methods described herein. Alternatively, components 110-112 can comprise hardware, such as a special purpose processing device to perform a certain function or group of functions.

FIG. 2 illustrates a sequence diagram of interactions between client device 102 and server device 106. In particular, FIG. 2 shows one example embodiment in which video edit system 110 coordinates with online content management system 112 to enable user 104 to interact with and edit a digital video. In particular, FIG. 2 shows an example embodiment in which user 104 interacts with a low resolution version of a digital video to generate one or more user edits to apply to the digital video. Additionally, FIG. 2 shows an example embodiment in which online content management system 112 receives and applies the user edits to low and/or high resolution versions of the digital video at server device 106.

As illustrated in FIG. 2, online content management system 112 manages 202 low and high resolution versions of a digital video. In one or more embodiments, managing the low and high resolution versions of the digital video includes receiving one or more copies of the digital video at the server device 106. For example, online content management system 112 can receive a high resolution version of a digital video transmitted to server device 106 from client device 102. Alternatively, online content management system 112 can receive the high resolution version of the digital video transmitted to server device 106 from another electronic device. For example, server device 106 can receive the high resolution version of the digital video from an electronic device that originally captured the digital video.

FIG. 2 and the remaining figures reference a single digital video with corresponding low and high resolution versions. The description of a single digital video is for ease in description and clarity. The present invention is not, however, limited to synchronizing edits for a single digital video. In contrast, one or more embodiments of online content management system 112 maintains multiple various digital videos, which can be used in one or more digital editing processes. For example, user 104 can capture a plurality of high resolution digital videos (e.g., using client device 102), which are provided by client device 102 to online content management system 112. Additionally, as will be described in further detail below, online content management system 112 can generate and synchronize one or more low resolution versions for each of the plurality of high resolution digital videos. For example, user 104, via video edit system 110 on client device 102, can select edits that cut and combine various segments of the various digital videos. Online content management system 112 can then, based on instructions encoding the selected edits, generate a revised high resolution digital video that is a combination of segments of the various high resolution digital videos. Thus, the term digital video refers to one or more digital videos.

Additionally, managing the low and high resolution versions of the digital video can include storing one or more copies of the digital video on server device 106. For example, upon receiving the high resolution version of the digital video, online content management system 112 can generate one or multiple low resolution copies of the high resolution digital video and store the low resolution version(s) of the digital video together with the high resolution version of the digital video at server device 106. It is appreciated that online content management system 112 can generate and store any number of copies of the digital video at server device 106. For example, online content management system 112 can generate multiple low resolution versions of the digital video each having a resolution lower than the high resolution version of the digital video.

Furthermore, online content management system 112 can manage access to one or more users and/or client devices requesting access to one or more versions of the digital video. For example, in one or more embodiments, online content management system 112 maintains one or more user profiles and/or device profiles to verify the identity of a user and/or electronic device requesting access to a digital video and/or other digital content associated with a particular account. Additionally, as will be described in greater detail below, online content management system 112 can further manage one or more permissions associated with editing low and/or high resolution versions of the digital video maintained at server device 106.

As shown in FIG. 2, online content management system 112 can cause server device 106 to provide 204 a low resolution version of the digital video to client device 102. For example, online content management system 112 can cause server device 106 to provide the low resolution version of the digital video to client device 102 via a download by client device 102. In one or more embodiments, server device 106 hosts the low resolution version of the digital video and client device 106 accesses the hosted low resolution version of the digital video via a website.

Additionally, in one or more embodiments, online content management system 112 can cause server device 106 to provide the low resolution version of the digital video in response to receiving a request for the digital video. For example, user 104 can visit a web site associated with online content management system 112 and request access to the digital video (or a specific portion of the digital video). In response, online content management system 112 can retrieve and cause server device 106 to provide the low resolution version of the digital video to client device 102.

In still further embodiments, online content management system 112 maintains an account associated with user 104 that has one or more client devices linked to the account. In response to client device 102 being linked with the account of online content management system 112, online content management system 112 synchronizes digital content associated with the account to client device 102. As such, upon generating or receiving the low resolution version of the digital video, online content management system 112 can synchronize the low resolution version of the digital video to client device 102.

Furthermore, in one or more embodiments, rather than providing an entire low resolution version of the digital video, online content management system 110 can cause server device 106 to provide a limited portion of the digital video. For example, online content management system 110 can identify a specific time segment (e.g., 1 minute clip) of the digital video and provide a portion of the low resolution version of the digital video corresponding to the specific time segment. As another example, online content management system 110 can identify a specific layer (e.g., audio layer, visual layer) of the digital video and provide a portion of the low resolution version of the digital video corresponding to the specific layer. In still further embodiments, online content management system 112 can stream the low resolution version of the digital video to client device 102.

Furthermore, optionally as part of step 204, online content management system 112 can select a resolution for the low resolution version of the digital video based on one or more capabilities of client device 102. For example, upon determining that client device 102 is a mobile phone, online content management system 112 can select a compression amount or a resolution and then generate the low resolution version of the digital video at the selected resolution. Additional or alternative capabilities of client device upon which online content management system can select a resolution for the low resolution version of the digital video include a screen size, a processor, a graphics card, a version of video edit system 110, or other capabilities of client device. The capabilities of client device 102 can be maintained by online content management system 112 upon registering client device 102 with online content management system 112. Alternatively, online content management system 112 can detect the capabilities of client device 102 or send request to client device 102 for the capabilities.

Online content management system 112 can generate any number of reduced or low resolution versions of the digital video having varying levels of resolutions based on client devices associated with an account of online content management system 112 with which the digital video is associated. For example, in determining how many low resolution versions to generate and respective resolutions for each low resolution version, online content management system 112 can consider properties of one or more client devices. For example, online content management system 112 can generate low resolution versions having different resolutions based on display specifications and/or screen dimensions of each client device. Additionally, online content management system 112 can determine resolutions and/or other features of low resolution versions based on different applications on one or more client devices. In some embodiments, online content management system 112 can generate low resolution versions having a range of predetermined resolutions to accommodate a range of client devices having different properties.

Optionally as part of step 204, online content management system 112 can further select the resolution for the low resolution version of the digital video based on a bandwidth available to client device 102. For example, online content management system 112 can detect a strength of a connection with client device 102 and base the resolution on the connection. This can help ensure that providing the low resolution version of the digital video is able to be performed in a reasonable amount of time.

As shown in FIG. 2, client device 102 can receive the low resolution version of the digital video. Additionally, as shown in FIG. 2, video edit system 110 can cause client device 102 to provide 206 the low resolution version of the digital video in a video editing interface. For example, video edit system 110 can provide a display of the low resolution version of the digital video on client device 102 within a web browser interface associated with online content management system 112. The web browser interface can include graphical elements and other features for interacting with and editing the digital video. In one or more embodiments, client device 102 provides a website including an online video editing application (e.g., video edit system 110) that runs within a web browser and enables user 104 to interact with and edit the digital video.

As an alternative to providing the low resolution version of the digital video within a web browser interface, in one or more embodiments, client device 102 provides a display of the low resolution version of the digital video within a local or native video editing application (e.g., video edit system 110) installed on client device 102. For example, client device 102 can download or otherwise install video edit system 110 to provide a display of the low resolution version of the digital video and enable one or more users to interact with the low resolution version of the digital video. In one or more embodiments, video edit system 110 can include a video editing application provided by or otherwise associated with online content management system 110.

As mentioned above, video edit system 110 can enable user 104 to interact with the low resolution version of the digital video displayed on client device 102. Additionally, as shown in FIG. 2, video edit system 110 can receive 208 user edits for the low resolution version of the digital video. For example, as user 104 interacts with the low resolution version of the digital video, user 104 can specify or otherwise identify one or more edits to apply to the digital video.

In particular, video edit system 110 can enable user 104 to interact with the video editing interface and identify user edits to apply to the digital video. For example, video edit system 110 can provide various graphical elements that user 104 may select and identify specific user edits for the digital video. For instance, video edit system 110 can provide graphical elements to modify visual properties, audio properties, or other properties of the digital video.

Additionally, in one or more embodiments, video edit system 110 enables user 104 to modify specific segments or layers of the digital video. For example, video edit system 110 can provide a video editing interface including selectable options to identify a specific segment of time of the digital video and enable user 104 to interact with and modify the identified segment of time. For instance, user 104 can cut, filter, reorder, or otherwise modify an identified segment of time of the digital video without editing or otherwise modifying other segments of the digital video. As another example, video edit system 110 can provide a video editing interface including selectable options to identify a specific layer (e.g., visual layer, audio layer) to interact with and modify the identified layer of the video (or a layer for a specific segment of the video). For instance, user 104 can modify a visual layer, audio layer, or other layer of the digital video without changing or otherwise modifying other layers of the digital video. It is appreciated that video edit system 110 can enable user 104 to interact with and specify edits for a specific time segment and/or layer of the digital video where client device 102 has received only a portion of the low resolution version of the digital video or the entire low resolution version of the digital video.

As illustrated in FIG. 2, upon receiving the user edits for the low resolution version of the digital video, video edit system 110 generates 210 a workflow of the user edits. In particular, video edit system 110 can compile information associated with one or more user edits indicated by user 104. For example, video edit system 110 can generate a data file (e.g., workflow) including any information associated with the digital video and received user edits that enables online content management system 112 to apply the user edits to a low and/or high resolution version of the digital video. In one or more embodiments, video edit system 110 generates the workflow of the user edits without applying any specific user edits to the low resolution version of the digital video received at client device 102.

The workflow of the user edits can comprise instructions indicating when and where to apply various user edits. For example, the workflow of user edits can comprise an indication of a portion of the video to edit and the edit to apply (e.g., cut segment starting at time 1:35 and ending at time 2:12, move segment starting at time 5:45 and ending at time 7:10 to position starting at time 1:35, sharpen entire video and so on). In at least one embodiment, client device 102 does not send the low resolution version or any portion of the digital video with or in connection with the workflow of user edits. Rather providing the workflow of user edits, in one or more embodiments, can consist of sending a data packet with instructions indication user edits to apply to the digital video.

Moreover, in one or more embodiments, prior to or concurrent to sending the workflow of user edits, client device 102 provides one or more specific types of edits or filters for pre-rendering prior to receiving the workflow and/or a command to render the user edits of the workflow. For example, in one or more embodiments, online content management system 112 recognizes certain edits or filters as edits or filters to apply prior to receiving a command (e.g., low resolution version command or high resolution version command) to apply the edits to one or more versions of the digital video. Thus, in response to receiving the workflow or individual receiving pre-defined user edits, online content management system 112 may automatically apply one or more user edits (or portion of multiple user edits) to one or more low resolution versions and/or high resolution versions of the digital video prior to receiving a command to apply the user edits to a version of the digital video maintained at server device 106.

Additionally, as shown in FIG. 2, video edit system 110 causes client device 102 to provide 212 the workflow of the user edits to server device 106. In one or more embodiments, video edit system 110 causes client device 102 to provide the workflow as user 104 interacts with the low resolution version of the digital video provided via the web editing interface. For example, video edit system 110 can cause client device 102 to provide each user edit to server device 106 upon receiving each user edit. As another example, video edit system 110 can generate an updated workflow with each received user edit and cause client device 102 to send an updated workflow with one or more additional user edits as those user edits are received at client device 102. Alternatively, as described above, in one or more embodiments, video edit system 110 compiles the workflow of user edits and provides the workflow to server device 106 upon determining that user 104 is done interacting with or making edits to the low resolution version of the digital video.

In one or more embodiments, video edit system 110 causes client device 102 to provide the workflow of user edits to server device 106 upon receiving a user input. For example, video edit system 110 can cause client device 102 to send the workflow of user edits in response to receiving a user input identifying that user 104 is done making edits to a digital video or otherwise requesting video edit system 110 to send the workflow of user edits to server device 106. In one or more embodiments, user 104 instructs video edit system 110 to send the workflow to server device 106 by selecting a graphical element or other selectable option within the video editing interface to instruct client device 102 to send the workflow to server device 106.

As an alternative to receiving a user input explicitly instructing that client device 102 send the workflow to server device 106, video edit system 110 can cause client device 102 to provide the workflow of user edits upon detecting various triggers. For example, as mentioned above, video edit system 110 can cause client device 102 to send a workflow or updated workflow of user edits upon receiving each user edit for the digital video. As another example, video edit system 110 can compile and provide the workflow of user edits upon detecting a threshold number of user edits identified by user 104 to be applied to the digital video. As another example, video edit system 110 can compile and provide the workflow of user edits at periodic time intervals or upon detecting that a defined period of time has passed without receiving any additional user edits.

Further, as shown in FIG. 2, video edit system 110 can cause client device 102 to provide 214 a low resolution render command to server device 106. In particular, video edit system 110 can cause client device 102 to provide instructions to server device 106 to apply user edits from the workflow to a low resolution version of the digital video. In one or more embodiments, client device 102 provides the workflow of user edits and the low resolution render command to server device 106 within the same data file or within the same transmission (e.g., upload). Additionally, in one or more embodiments, video edit system 110 causes the client device 102 to provide the workflow of user edits and the low resolution render command to server device 106 upon receiving a single user input. For example, user 104 can select a single graphical element within a video editing interface to send the workflow of user edits and the low resolution render command to server device 106.

In one or more embodiments, video edit system 110 causes client device 102 to first provide the low resolution render command after providing the workflow of user edits to server device 106. For example, in one or more embodiments, user 104 provides a first user input causing client device 102 to send the workflow of user edits to server device and subsequently provides a second input causing client device 102 to send the low resolution render command to server device 106. For instance, user 104 can select a first selectable option within a video editing interface to send the workflow of user edits to server device 106. User 104 can then select a second selectable option within the video editing interface to render the user edits from the workflow to one or more low resolution versions of the digital video.

As an alternative to receiving a user input causing client device 102 to send the low resolution render command to server device 106, video edit system 110 can cause client device 102 to send the low resolution render command to server device 106 upon detecting a defined number of user edits. For example, similar to one or more embodiments described above in connection with sending the workflow of user edits to server device 106, video edit system 110 can cause client device 102 to send the low resolution render command to server device 106 in response to detecting that a threshold number of user edits have been generated for the digital video. As another example, in one or more embodiments, video edit system 110 causes client device 102 to send each user edit (or an updated workflow comprising each user edit) in response to user 104 identifying each user edit to apply to the digital video.

In one or more embodiments, video edit system 110 causes client device 102 to send the low resolution render command to server device 106 based on one or more time conditions. For example, video edit system 110 can cause client device 102 to send the low resolution render command to server device 106 at defined time intervals. As another example, video edit system 110 can cause client device 102 to send the low resolution render command in response to detecting that a threshold time period has passed since receiving a latest user edit from user 104.

Additionally, as shown in FIG. 2, online content management system 112 can apply 216 user edits from the workflow to the low resolution version of the digital video to generate a revised low resolution version of the digital video. For example, in response to receiving the low resolution render command, online content management system 112 can apply any number of user edits from the received workflow to one or all low resolution versions of the digital video maintained at server device 106. In one or more embodiments, online content management system 112 applies user edits from the workflow to one or more low resolution versions of the digital video without applying any user edits from the workflow to a high resolution version of the digital video maintained at server device 106.

As shown in FIG. 2, online content management system 112 causes server device to provide 218 a revised low resolution version of the digital video to client device 102. For example, online content management system 112 can cause server device 106 to provide the revised low resolution version of the digital video to client device via a download by client device 102. In one or more embodiments, online content management system 112 causes server device 106 to provide the revised low resolution version of the digital video to client device 106 via any of the method or transmission protocols discussed above in relation to step 204.

As further shown in FIG. 2, video edit system 110 can provide 220 the revised low resolution version of the digital video in the video editing interface. For example, in one or more embodiments, video edit system 110 provides a display of the revised low resolution version of the digital video in a web browser interface. Alternatively, video edit system 110 can provide a display of the revised low resolution version of the digital video in a video editing interface installed on client device 102.

In one or more embodiments, video edit system 110 enables user 104 to review and further interact with and generate additional user edits to apply to the revised low resolution version of the digital video. For example, user 104 can interact with the revised low resolution version of the digital video displayed within the video editing interface and generate another workflow of user edits to apply to the revised low resolution version of the digital video. Thus, one or more embodiments can involve repeating steps 206-220 until the user is satisfied with a revised low resolution version of the digital video. One will appreciate in light of the disclosure herein, that the foregoing process can enable a user using client device 102 to apply, review, and revise various low resolution version of the digital video without having client device 102 render the edits or send large files to server device 106.

As shown in FIG. 2, video edit system 110 can cause client device 102 to provide 222 a high resolution render command to server device 106. In particular, video edit system 110 can cause client device 102 to provide instructions to server device 106 to render the user edits from the workflow(s) of user edits a high resolution version of the digital video maintained at server device 106. It is appreciated that video edit system 110 can cause client device 102 to provide a high resolution render command including instructions for server device 106 to render any number of user edits from one or multiple workflows of user edits to the high resolution version of the digital video. For example, video edit system 110 can cause client device 102 to provide a high resolution render command including instructions to render any user edits already applied to the revised low resolution version of the digital video.

Similar to one or more embodiments described above in connection with providing the low resolution render command, video edit system 110 can cause client device 102 to provide the low resolution render command in response to receiving one or more user inputs. For example, video edit system 110 can receive a user input instructing video edit system 110 to send the high resolution render command to server device 106. For example, after previewing a display of the revised low resolution version of the digital video, user 104 can select a selectable option provided within the video editing interface to render the user edits from any number of workflows to the high resolution version of the digital video. In response, video edit system 110 can cause client device 102 to provide the high resolution render command to server device 106.

As an alternative to providing the high resolution render command in response to receiving a user input, video edit system 110 can cause client device 102 to provide the high resolution render command in response to various triggers. For example, in one or more embodiments, video edit system 110 causes the high resolution render command to be sent in response to detecting that a threshold number of user edits have been generated for a particular digital video. As another example, video edit system 110 can cause the high resolution render command to be sent based on one or more time conditions. For instance, video edit system 110 can cause client device to send the high resolution render command at a defined time interval (e.g., once per day) including instructions to apply any user edits received within the defined time interval. As another example, video edit system 110 can cause the high resolution render command to be sent after a time-out period or upon determining that video edit system 110 has not received one or more user edits for a threshold time period.

As shown in FIG. 2, online content management system 112 can apply 224 user edits from the workflow to a high resolution version of the digital video to generate a revised high resolution version of the digital video. For example, online content management system 112 can apply user edits to the high resolution version of the digital video in response to receiving the high resolution render command from client device 102. In one or more embodiments, online content management system 112 renders those user edits from the received workflow received from client device 102. Additionally, it is appreciated that online content management system 112 can apply any number of user edits from multiple workflows received from client device 102. In one or more embodiments, online content management system 112 applies user edits from each of multiple workflows in chronological order in which server device 106 receives workflows. In this way, online content management system 112 can prevent conflicting user edits by giving deference to more recent user edits.

Thus, video edit system 110 and online content management system 112 can enable user 104 to generate and apply user edits from multiple workflows to iteratively revise a digital video. In particular, as described above, video edit system 110 can cause client device 102 to provide multiple workflows including user edits to multiple low resolution versions and/or revised low resolution versions of the digital video. Additionally, in response to receiving one or multiple low resolution render commands, online content management system 112 can iteratively update the low resolution versions of the digital video to include each workflow of user edits. Further, upon final approval of a most recent revised version of the low resolution digital video (e.g., by user 104), online content management system 112 can finally apply each user edit of multiple workflows to the high resolution version of the digital video to generate the revised high resolution version of the digital video in a single rendering operation.

Upon generating the revised high resolution version of the digital video, online content management system 112 can provide the revised high resolution version of the digital video to client device 102. For example, online content management system 112 can synchronize the revised high resolution version of the digital video to client devices associated with the account of user 104 and/or having authority to access the account of user 104 with online content management system 112.

Figure 3:
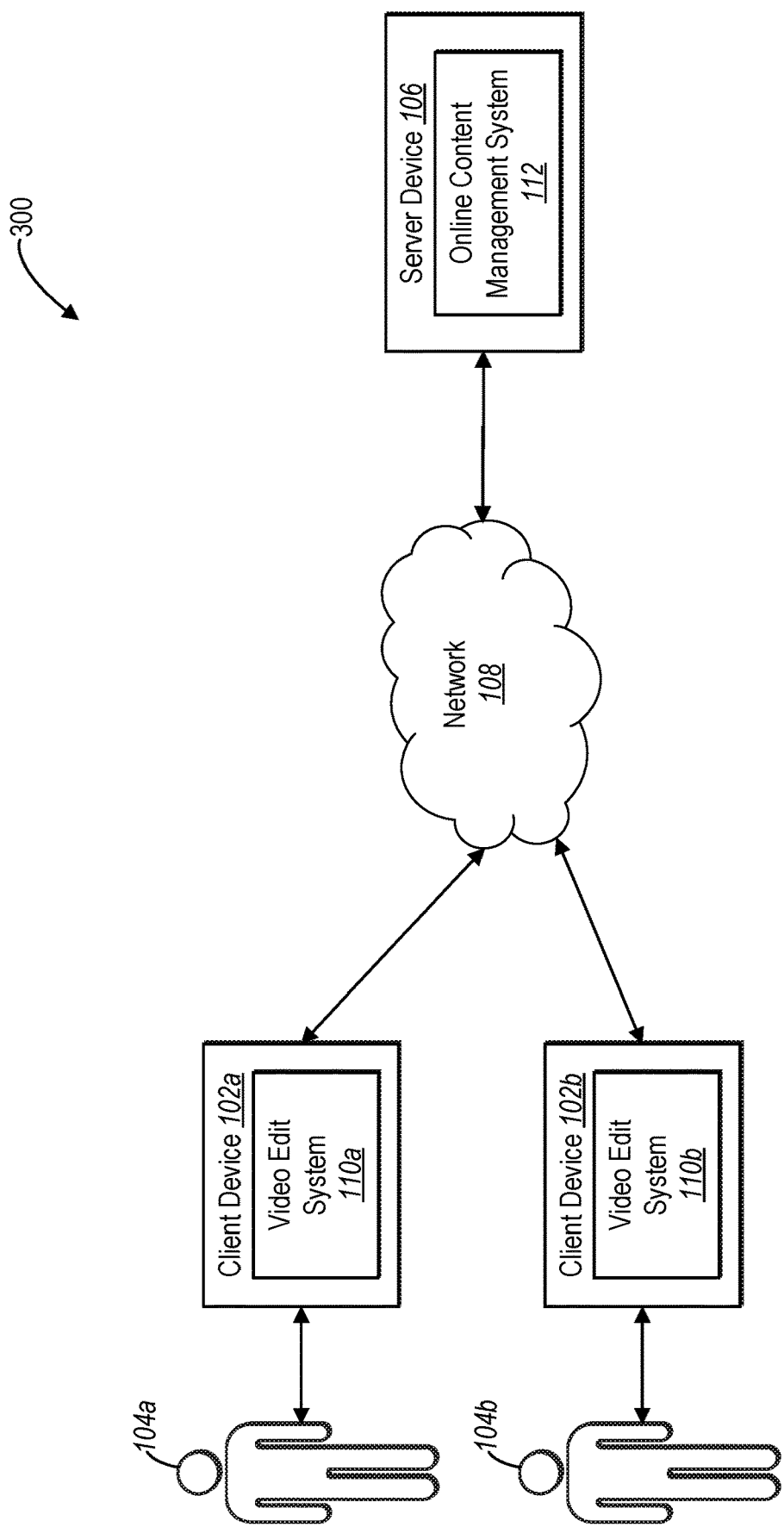
FIG. 3 illustrates a block diagram of another example environment for implementing a video editing system in accordance with one or more embodiments.

FIG. 3 illustrates another example video editing system 300 to enable one or more users to cooperatively edit a digital video. It is appreciated that features and functionality as described above in connection with FIGS. 1-2 can similarly apply to video editing system 300 shown and described in connection with FIGS. 3-4B. Additionally, it is appreciated that features and functionality described below in connection with FIGS. 3-4B with regard to multiple users and devices cooperatively editing a digital video can similarly apply to the video editing system 100 described above in connection with FIG. 1.

As shown in FIG. 3, video editing system 300 includes client devices 102a-b associated with respective users 104a-b. Each of client devices 102a-b can communicate with server device 106 via network 108. As shown in FIG. 3, each of client devices 102a-b include video edit systems 110a-b thereon. Additionally, as shown in FIG. 3, server device 106 can include online content management system 112. It is appreciated that client devices 102a-b, server device 106, and network 108 can include similar features and functionality as client device 102, server device 106, and network 108 described above in connection with FIGS. 1-2. Additionally, it is appreciated that video edit systems 110a-b and online content management system 112 can include similar features and functionality as video edit system 110 and online content management system 112 described above in connection with FIGS. 1-2.

For example, as described above, video editing system 300 can enable users 104a-b to interact with one or more low resolution versions of a digital video and apply user edits to the digital video at server device 106. Additionally, each of users 104a-b can interact with low resolution versions provided via video editing interfaces on respective client devices 102a-b and provide instructions to server device 106 to render user edits to low resolution versions of the digital video and subsequently render user edits to a high resolution version of the digital video. For example, similar to one or more embodiments described above, video edit systems 110a-b and online content management system 112 can cooperate to enable one or both users 104a-b to iteratively edit one or multiple low resolution versions of the digital video and finally apply user edits to a high resolution version of the digital video.

Additionally, video editing system 300 can enable multiple users 104a-b to cooperatively edit a digital video. In particular, in one or more embodiments, both first user 104a and second user 104b interact with copies of the same low resolution version of the digital video received at each of client devices 102a-b. For example, video edit system 110a on first client device 102a provides a display of a low resolution version of the digital video to first user 104a to interact with and identify one or more user edits to apply to the digital video. Additionally, video edit system 110b on second client device 102b provides a display of the same low resolution version of the digital video to second user 104b to interact with and identify one or more user edits to apply to the digital video. In each case, video edit systems 110a-b can cause client devices 102a-b to provide low resolution render commands to server device 106 including instructions for online content management system 112 to generate respective low resolution versions of the digital video.

Upon receiving workflows of user edits and low resolution render commands from respective client devices 102a-b, online content management system 112 can generate one or multiple revised low resolution versions of the digital video. For example, in one or more embodiments, online content management system 112 generates a revised low resolution version of the digital video for each user 104a-b corresponding to workflows received from each of client devices 102a-b. Thus, online content management system 112 can generate a first revised low resolution version of the digital video based on a first workflow of user edits received from first client device 102a and a second revised low resolution version of the digital video based on a second workflow of user edits received from second client device 102b. In one or more embodiments, online content management system 112 consolidates user edits from multiple workflows to generate a revised low resolution version of the digital video including user edits received from multiple client devices 102a-b.

As an alternative to generating revised low resolution versions of the digital video corresponding to each received workflow of user edits, in one or more embodiments, online content management system 112 generates a revised low resolution version of the digital upon receiving each workflow of user edits. For example, where server device 106 receives a first workflow from first client device 102a and a second workflow from second client device 102b, online content management system 112 can iteratively apply the user edits from each received workflow. In particular, online content management system 112 can first apply user edits from the first workflow to generate a first revised low resolution version of the digital video and subsequently apply the user edits from the second workflow to generate a second revised low resolution version of the digital video. In one or more embodiments, online content management system 112 applies edits from each workflow of user edits in the order in which the workflows are received. Alternatively, in one or more embodiments, online content management system 112 applies the user edits from each workflow in the order in which a corresponding low resolution render command is received from client devices 102a-b.

Similar to one or more embodiments described herein, server device 106 can further receive a high resolution render command from one of client devices 102a-b. For example, server device 106 can receive a high resolution render command from either first client device 102a or second client device 102b. In response to receiving the high resolution render command, online content management system 112 can render user edits from any number of workflows received from client devices 102a-b to a high resolution version of the digital video maintained at server device 106 and generate a revised high resolution version of the digital video. As such, video editing system 300 enables multiple users 104a-b to interact with and identify user edits that online content management system 112 applies to both low resolution and high resolution versions of the digital video.

Figure 4A:
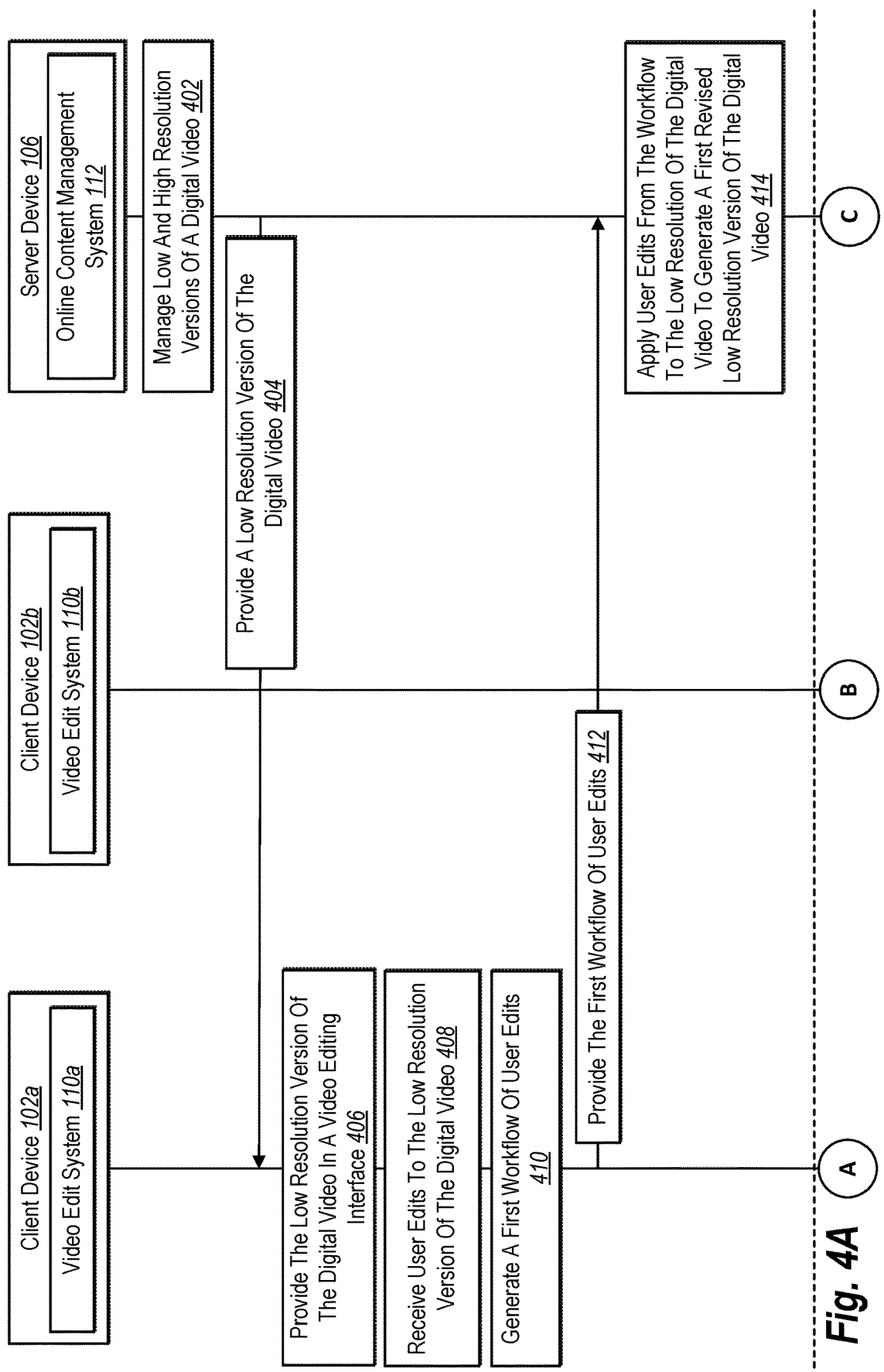
FIGS. 4A-4B illustrates a flow diagram of interactions between multiple client devices and a server device in accordance with one or more embodiments.
Figure 4B:
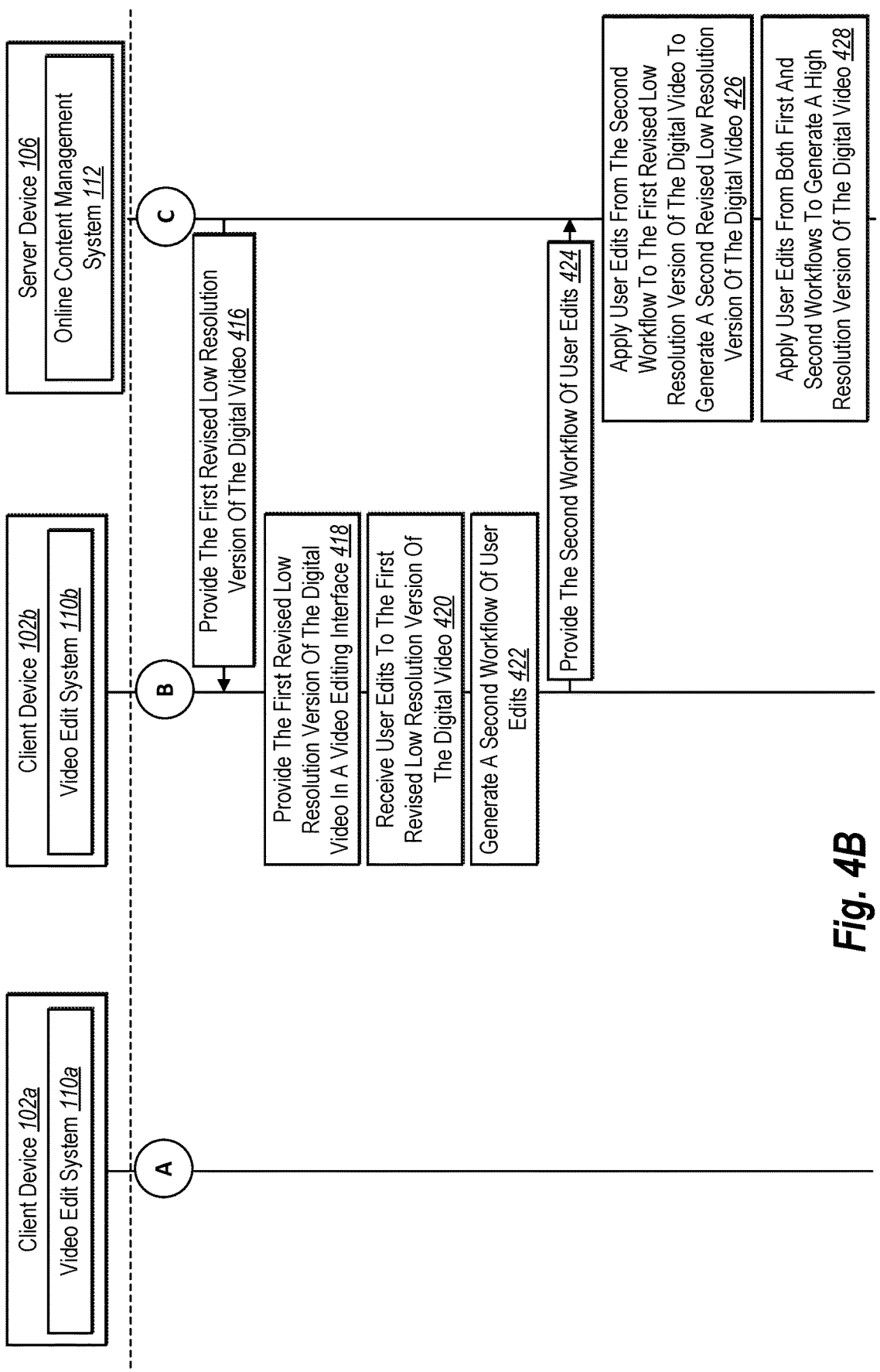

FIGS. 4A-4B illustrate a sequence diagram of interactions between client devices 102a-b and server device 106. In particular, FIGS. 4A-4B show one example embodiment in which video edit systems 110a-b coordinate with online content management system 112 to enable users 104a-b to interact with and edit a digital video. In particular, FIGS. 4A-4B shows an example embodiment in which users 104a-b cooperatively edit low resolution versions of a digital video and generate user edits to apply to the digital video at server device 106. Additionally, FIGS. 4A-4B show an example embodiment in which online content management system 112 receives and applies the user edits to low and/or high resolution versions of the digital video at server device 106. It is appreciated that one or more interactions shown in FIGS. 4A-4B can include similar features and functionality as described above in connection with similar interactions described above in connection with FIG. 2.

As illustrated in FIG. 4A, online content management system 112 manages 402 low and high resolution versions of a digital video in the manner as discussed above in relation to step 202 of FIG. 2. For example, online content management system 112 can receive a high resolution version of the digital video (e.g., from one of client devices 102a-b) and store the high resolution version at server device 106. Additionally, online content management system 112 can generate one or more low resolution versions of the digital video. Further, online content management system 112 can manage access to the low and/or high resolution versions of the digital video.

As shown in FIG. 4A, online content management system 112 causes server device 106 to provide 204 a low resolution version of the digital video to first client device 102a in the manner as discussed above in relation to step 204 of FIG. 2. For example, online content management system 112 can cause server device 106 to provide a website including an interface for displaying the low resolution version of the digital video on first client device 102a. In one or more embodiments, online content management system 112 causes server device 106 to provide only a portion of the low resolution version of the digital video including a limited segment of the digital video and/or specific layers of the digital video without providing the entire low resolution version of the digital video to first client device 102a.

As further shown in FIG. 4A, upon receiving the low resolution version of the digital video, video edit system 110a can provide 406 the low resolution version of the digital video in a video editing interface on first client device 102a in the manner as discussed above in relation to step 206 of FIG. 2. For example, video edit system 110a can provide a display of the low resolution version of the digital video within a web browser interface. Alternatively, in one or more embodiments, video edit system 110a provides a display of the low resolution version of the digital video within a video editing application installed on first client device 102a.

Additionally, as shown in FIG. 4A, video edit system 110a can receive 408 user edits to the low resolution version of the digital video in the manner as discussed above in relation to step 208 of FIG. 2. For example, in one or more embodiments, video edit system 110a provides various graphical elements that user 104a can select and identify user edits to apply to the digital video. Further, in response to receiving user edits, video edit system 110a can generate 410 a first workflow of user edits, as shown in FIG. 4A. For example, video edit system 110a can compile one or more edits identified by first user 104a into a data file including information associated with editing the digital video.

As further shown in FIG. 4A, video edit system 110a can cause client device 102a to provide 412 the first workflow of user edits to server device 106 in the manner as discussed above in relation to step 210 of FIG. 2. For example, video edit system 110a can cause client device 102a to upload the first workflow of user edits to server device 106. Similar to one or more embodiments described above, video edit system 110a can cause client device 102a to provide a low resolution render command to server device 106. For example, video edit system 110a can cause client device 102 to provide the low resolution render command to server device 106 together with the workflow of user edits.

Moreover, in one or more embodiments, one or more of client devices 102a-b include limited rendering capabilities. As an example, in one or more embodiments, client device 102a additionally sends the first workflow of user edits to client device 102b having rendering capabilities to apply one or more of the user edits to a version of the digital video maintained at client device 102b. Thus, second client device 102b can locally apply one or more of the user edits prior to receiving a revised version of the digital video. In one or more embodiments, the server device 106 detects rendering capabilities of the client devices 102a-b and distributes one or more edits of the workflow based on detected rendering capabilities of the client devices 102a-b. Additionally, in one or more embodiments, online content management system 112 detects storage availability on client devices 102a-b and determines which version of a digital video and/or edits to send to respective client devices 102a-b.

As shown in FIG. 4A, online content management system 112 can apply 414 user edits from the first workflow to a low resolution version of the digital video to generate a first revised low resolution version of the digital video in the manner as discussed above in relation to step 212 of FIG. 2. In one or more embodiments, online content management system 112 applies the user edits from the first workflow to all low resolution versions of the digital video maintained by online content management system 112 to generate multiple revised low resolution versions of the digital video to provide to multiple client devices 110a-b. Alternatively, in one or more embodiments, online content management system 112 applies the user edits from the first workflow to a low resolution version to generate a single revised low resolution version that is provided to one or both client devices 110a-b.

While FIG. 4A illustrates interactions 404-414 in which video editing system 300 enables first user 104a of first client device 102a to receive and generate edits to a low resolution version of the digital video provided to first client device 102a, FIGS. 4A-4B further illustrate interactions 416-426 in which video editing system 300 enables second user 104b of second client device 102b to receive and generate edits to another low resolution version (e.g., revised low resolution version) of the digital video provided to second client device 102b. It is appreciated that each of interactions 416-426 with regard to enabling second user 104b to interact with and edit a revised low resolution version of the digital video can include similar features as described above in connection with interactions 404-426.

For example, as shown in FIG. 4B, online content management system 112 can cause server device 106 to provide 416 the revised low resolution version of the digital video to second client device 102b. Alternatively, in one or more embodiments, online content management system 112 provides a version of the digital video according to available storage on client device 102b. For example, upon detecting that second client device 102b includes adequate storage, online content management system 112 can provide a mid-resolution or higher resolution version of the digital content item with which user 104b interacts and identifies user edits. Additionally, as shown in FIG. 4B, video edit system 110b on second client device 102b can provide 418 the revised low resolution version of the digital video in a video editing interface. Video edit system 110b can further receive 420 user edits to the revised low resolution version of the digital video. As shown in FIG. 4B, video edit system 110b can also generate 422 a second workflow of user edits and cause second client device 102b to provide 424 the second workflow of user edits to server device 106. Moreover, as shown in FIG. 4B, online content management system 112 can apply 426 user edits from the second workflow to the revised low resolution version of the digital video to generate a second revised low resolution version of the digital video.

Additionally, as shown in FIG. 4B, online content management system 112 can apply 428 user edits from both first and second workflows to generate a high resolution version of the digital video. For example, online content management system 112 can generate a revised high resolution version of the digital video that reflects each of the user edits generated by both first client device 102a and second client device 102b. In one or more embodiments, online content management system 112 renders the user edits from each of multiple workflows using the same rendering engine at server device 106 as the rendering engine used to render user edits to each of the low resolution versions of the digital video.

Similar to one or more embodiments described above, online content management system 112 can apply the user edits from one or more workflows to the low and high resolution versions of the digital in response to receiving one or more render commands. For example, in response to receiving the first workflow and a first low resolution render command from first client device 102a, online content management system 112 can render the user edits from the first workflow to the low resolution version of the digital video to generate a first revised low resolution version of the digital video. Additionally, in response to receiving the second workflow and a second low resolution render command from second client device 102b, online content management system 112 can render the user edits from the second workflow to the revised low resolution version of the digital video to generate a second revised low resolution version of the digital video. Furthermore, in response to receiving a high resolution render command from either first user device 102a or second user device 102b, online content management system 112 can apply user edits from any number of workflows to the high resolution version of the digital video to generate a revised high resolution version of the digital video.

In one or more embodiments, online content management system 112 further manages permissions associated with rendering user edits to low and/or high resolution versions of the digital video. In particular, in one or more embodiments, online content management system 112 maintains different permissions associated with respective users 104a-b with regard to rendering user edits to issuing low resolution render commands and/or high resolution render commands. For example, while both first user 104a and second user 104b may have permission to cause user edits to be applied to low resolution versions of the digital video, online content management system 112 may only allow second user 104b to issue a high resolution render command to cause user edits from any number of workflows to be applied to the high resolution version of the digital video. As such, online content management system 112 can prevent conflicting changes from being applied to a high resolution version of the digital video and enable one or more users having higher permissions (e.g., administrative access) to the digital video to finally confirm user edits by applying the user edits to the high resolution version of the digital video maintained by online content management system 112.

Figure 5:
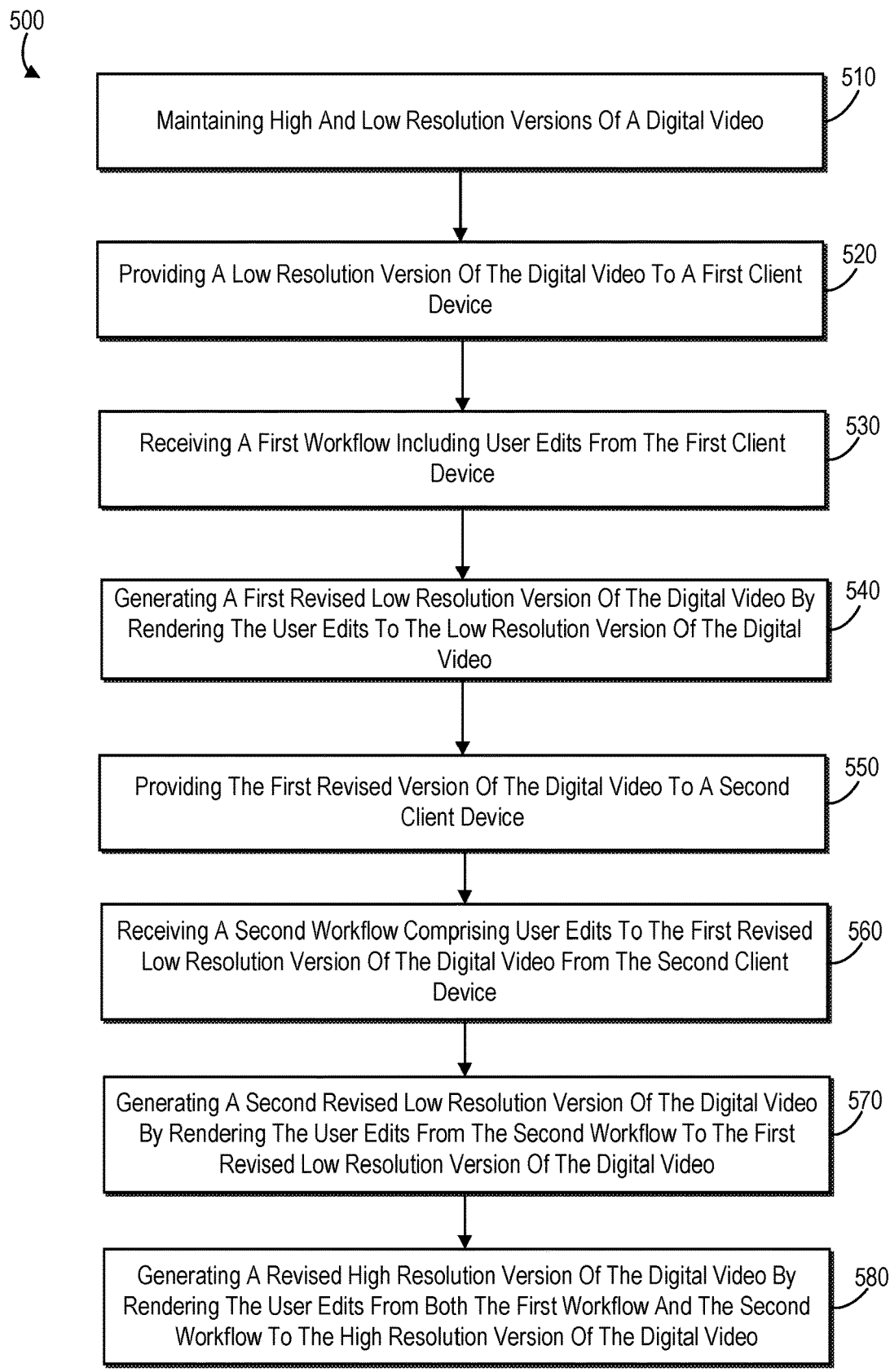
FIG. 5 illustrates flowchart of a series of a acts in a method of modifying a digital video in accordance with one or more embodiments.

FIG. 5 illustrates a flowchart of one example method 500 of applying user modifications to a digital video file. While FIG. 5 illustrates example steps according to one embodiment, other embodiments may omit, add to, reorder, and/or modify any of the steps shown in FIG. 5. Additionally, one or more steps shown in FIG. 5 may be performed by a client device, server device, or combination of components located thereon.

As shown in FIG. 5, method 500 includes act 510 of maintaining high and low resolution versions of a digital video. For example, act 510 can involve maintaining, at a content management system, a high resolution version of a digital video and a low resolution version of the digital video. In one or more embodiments, maintaining high and low resolution versions of a digital video involves receiving a high resolution version of a digital video from client device 104 or other computing device. Additionally, maintaining high and low resolution versions of a digital video can involve generating one or more low resolution versions of the digital video based on the high resolution version of the digital video. For example, managing low resolution and high resolution versions of the digital video can involve generating one or more low resolution copies of an original digital video.

As further shown in FIG. 5, method 500 includes act 520 of providing a low resolution version of the digital video to first client device 102a. For example, act 520 can involve providing, to first client device 102a, the low resolution version of the digital video. In one or more embodiment, providing the low resolution version of the digital video involves providing the low resolution version of the digital video via a web browser interface on first client device 102a. Alternatively, in one or more embodiments, providing the low resolution version of the digital video involves providing the low resolution version of the digital video via a video editing application installed on first client device 102a. Optionally, act 520 can involve providing the low resolution version of the digital video to the first client device by synchronizing the low resolution version of the digital video to client devices associated with an account of an online content management system.

Act 520 can involve selecting a first resolution for the low resolution version of the digital video based on one or more capabilities of the first client device. For example, act 520 can involve selecting a resolution based on a type of the first client device (smart phone, vs tablet computer vs laptop computer, etc.), a screen size of the first client device, a graphics processor of the first client device or a combination thereof. Act 520 can further involve generating the low resolution version of the digital video at the first resolution. Still further act 520 can involve detecting a bandwidth available to the first client device and selecting the first resolution further based on the detected bandwidth.

As shown in FIG. 5, method 500 further includes act 530 of receiving a first workflow including user edits from first client device 102a. For example, act 530 can involve receiving, from first client device 102a, a first workflow including user edits of the low resolution version of the digital video. In one or more embodiments, receiving the first workflow involves receiving a data file including instructions that may be used for revising the low resolution and/or high resolution versions of the digital video.

As shown in FIG. 5, method 500 further includes act 540 of generating a first revised low resolution version of the digital video by rendering the user edits to the low resolution version of the digital video. For example, act 540 can involve generating a first revised low resolution version of the digital video by rendering, at content management system 112, the user edits to the low resolution version of the digital video. In one or more embodiments, generating the first revised low resolution version is performed for each low resolution version of the digital video maintained by online content management system 112. Alternatively, in one or more embodiments, generating the first revised low resolution version involves modifying only the low resolution version of the digital video provided to first client device 102a.

As shown in FIG. 5, method 500 further includes act 550 of providing the first revised version of the digital video to second client device 102b. For example, act 550 can involve providing, to second client device 102b the first revised low resolution version of the digital video. In one or more embodiments, providing the first revised low resolution version of the digital video involves providing the first revised low resolution version of the digital video via a web browser interface on second client device 102b. Alternatively, providing the first revised low resolution version of the digital video can involve providing the first revised low resolution version of the digital video via a video editing application installed on second client device 102b. Alternatively, act 550 can involve providing the first revised low resolution version of the digital video to the second client device by synchronizing the first revised low resolution version of the digital video to client devices associated with an account of an online content management system.

Act 550 can involve selecting a second resolution for the revised low resolution version of the digital video based on one or more capabilities of the second client device. For example, act 550 can involve selecting a resolution based on a type of the second client device (smart phone, vs tablet computer vs laptop computer, etc.), a screen size of the first client device, a graphics processor of the second client device or a combination thereof. Act 550 can further involve generating the revised low resolution version of the digital video at the second resolution. Still further act 550 can involve detecting a bandwidth available to the second client device and selecting the second resolution further based on the detected bandwidth. As the resolution of the low resolution version and the revised low resolution version are tailored to the client devices receiving them, the low resolution version and the revised low resolution version can have different resolutions. Optionally, the method can involve generating two revised low resolution versions of the digital video one at the first resolution tailored for the first client device and another at the second resolution tailored for the second client device. In one or more embodiments, the first and second resolutions differ. For example, the first resolution can be lower than the second resolution or vice versa.

As shown in FIG. 5, method 500 further includes act 560 of receiving a second workflow comprising user edits to the first revised low resolution version of the digital video from second client device 102b. For example, act 560 can involve receiving, from second client device 102b, a second workflow including user edits to the first revised low resolution version of the digital video. In one or more embodiments, receiving the second workflow involves receiving a data file including instructions that may be used for further revising low and/or high resolution versions of the digital video.

As shown in FIG. 5, method 500 further includes act 570 of generating a second revised low resolution version of the digital video by rendering the user edits from the second workflow to the first revised low resolution version of the digital video. For example, act 570 can involve generating a second revised low resolution version of the digital video by rendering, at online content management system 112, the user edits from the second workflow to the first revised low resolution version of the digital video.

It is appreciated that method 500 can include receiving and applying any number of user edits to different low resolution versions of the digital video. For example, method 500 can include receiving any number of workflows from first client device 102*a* and/or second client device 102*b*. Additionally, method 500 can include generating any number of revised low resolution versions of the digital video in response to receiving workflows including user edits to respective low resolution versions of the digital video.

As further shown in FIG. 5, method 500 further includes act 580 of generating a revised high resolution version of the digital video by rendering the user edits from both the first workflow and the second workflow to the high resolution version of the digital video. For example, act 580 can involve generating a revised high resolution version of the digital video by rendering, at content management system 112, the user edits from the first workflow and the user edits from the second workflow to the high resolution version of the digital video. In one or more embodiments, generating the revised high resolution version of the digital video involves revising the high resolution version of the digital video to reflect the most recently revised low resolution version of the digital video. Alternatively, in one or more embodiments, generating the revised high resolution version of the digital video involves revising the high resolution video to reflect each received user edit from one or multiple workflows.

Method 500 can further include receiving one or more render commands including instructions to selectively update low and/or high resolution versions of the digital video. For example, method 500 can include receiving, from first client device 102*a*, a first low resolution render command. In one or more embodiments, generating the first revised low resolution version of the digital video is performed in response to receiving the first low resolution render command. Additionally, method 500 can include receiving, from second client device 102*b*, a second low resolution render command. In one or more embodiments, generating the second revised low resolution version of the digital video is performed in response to receiving the second low resolution render command.

Additionally, method 500 can include receiving a high resolution render command including instructions to apply one or more user edits to a high resolution version of the digital video. In one or more embodiments, generating the revised high resolution version of the digital video is performed in response to receiving the high resolution render command. Additionally, receiving the high resolution render command may involve receiving the high resolution render command from either first client device 102*a* or second client device 102*b*.

As a first example, in one or more embodiments, method 500 includes providing, to first client device 102*a*, the second revised low resolution version of the digital video. Method 500 can further include receiving, from first client device 102*a*, a high resolution render command including instructions to update the high resolution render command to reflect user edits applied to the second revised low resolution version of the digital video. Additionally, in one or more embodiments, generating the revised high resolution version of the digital video is performed in response to receiving the high resolution render command from first client device 102*a*.

As another example, in one or more embodiments, method 500 includes providing, to second client device 102*b*, the second revised low resolution version of the digital video. Method 500 can further include receiving, from second client device 102*b*, a high resolution render command including instructions to update the high resolution render command to reflect user edits applied to the second revised low resolution version of the digital video. Additionally, in one or more embodiments, generating the revised high resolution version of the digital video is performed in response to receiving the high resolution render command.

As an alternative to receiving high resolution render command including a user input explicitly instructing online content management system 112 to generate a high resolution version of the digital video, in one or more embodiments, method 500 includes determining that a threshold period of time has passed without receiving any additional user edits of the digital video. In one or more embodiments, generating the revised high resolution version of the digital video is performed in response to determining that the threshold period of time has passed without receiving any additional user edits of the digital video.

Moreover, in one or more embodiments, method 500 can include managing user edits in accordance with one or more user permissions. For example, method 500 can include maintaining, at content management system 112, user permissions associated with applying user edits to the digital video. Additionally, method 500 can include receiving, from first client device 102*a* associated with first user 104*a*, a rendering command to apply the user edits of the first workflow to the digital video. Method 500 can further include determining that first user 104*a* is associated with a user permission limited to applying user edits to the low resolution version of the digital video. Additionally, in one or more embodiments, generating the first revised low resolution version of the digital video is performed in response to receiving the rendering command in accordance with the user permission associated with first user 104*a*.

Additionally, in one or more embodiments related to user permissions, method 500 includes receiving, from second client device 102*b* associated with second user 104*b*, a rendering command to apply the user edits of the second workflow to the digital video. Additionally, method 500 can include determining that second user 104*b* is associated with a user permission that permits second user 104*b* to apply user edits to both the low resolution version and high resolution version of the digital video. Further, in one or more embodiments, generating the revised high resolution version of the digital video is performed in response to receiving the rendering command in accordance with the user permission associated with second user 104*b*.

Method 500 can also involve providing the revised high resolution version of the digital video to the first and second client devices by synchronizing the revised high resolution version of the digital video to client devices associated with an account of an online content management system.

Figure 6:
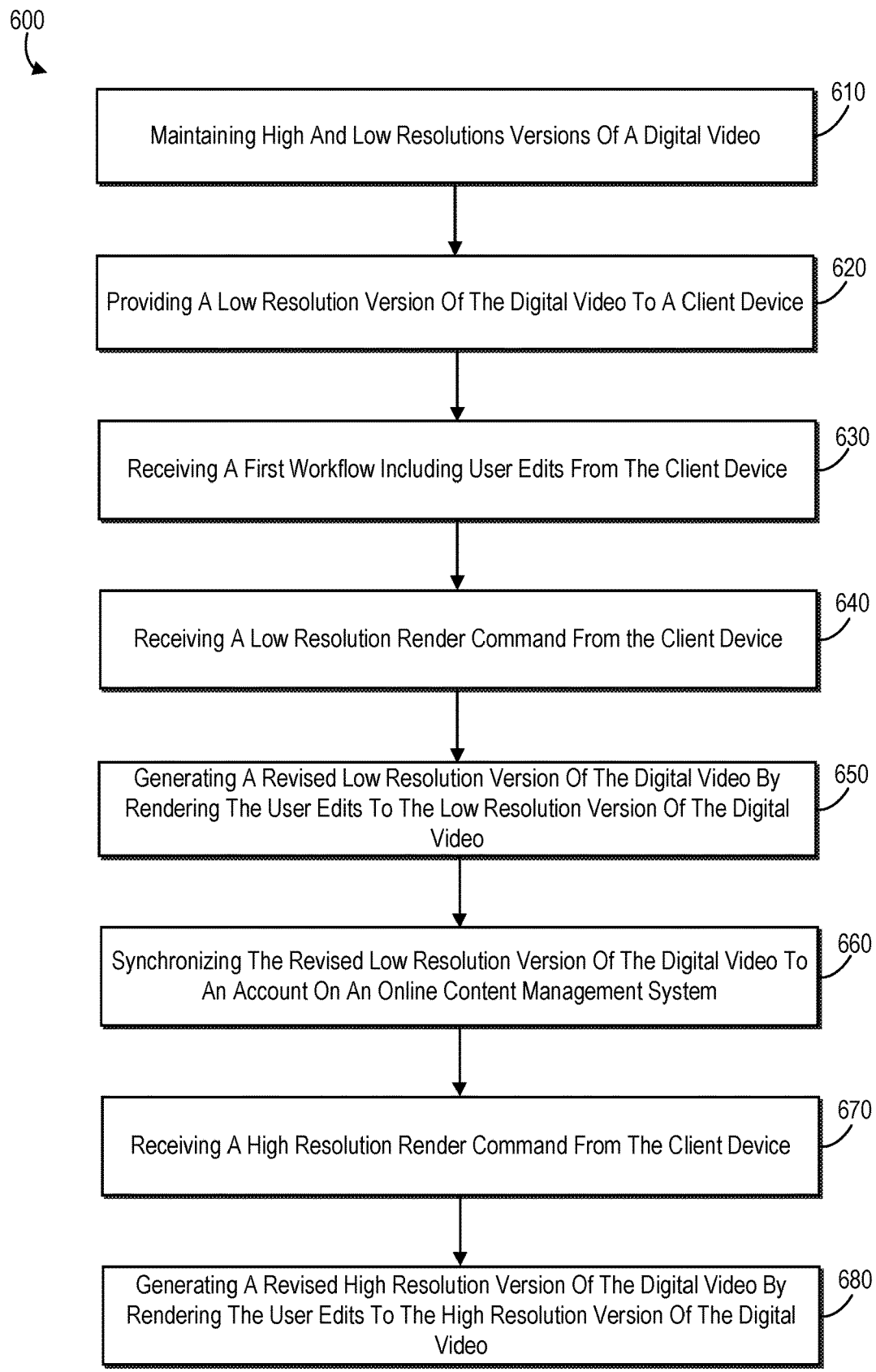
FIG. 6 illustrates another flowchart of a series of acts in a method of modifying a digital video in accordance with one or more embodiments.

FIG. 6 illustrates a flowchart of another example method 600 of applying user modifications to a digital video file. While FIG. 6 illustrates example steps according to one embodiment, other embodiments may omit, add to, reorder, and/or modify any of the steps shown in FIG. 6. Additionally, one or more steps shown in FIG. 5 may be performed by a client device, server device, or combination of components located thereon.

As shown in FIG. 6, method 600 includes act 610 of maintaining high and low resolution versions of a digital video. For example, act 610 can involve maintaining, at content management system 112, a high resolution version of a digital video and a low resolution version of the digital video.

As shown in FIG. 6, method 600 further includes act 620 of providing a low resolution version of the digital video to client device 102. For example, act 620 can involve providing, to client device 102, the low resolution version of the digital video. In one or more embodiments, providing the low resolution version of the digital video to client device 102 involves providing the low resolution version of the digital video within a web browser interface on client device 102. In one or more embodiments, providing the low resolution version of the digital video further involves providing one or more selectable options associated with editing the digital video. For example, providing the low resolution version of the digital video can involve providing a video editing interface including selectable options to identify portions of the digital video and one or more edits to apply to the digital video.

As shown in FIG. 6, method 600 further includes act 630 of receiving a first workflow including user edits from client device 102. For example, act 630 can involve receiving, from client device 102, a first workflow comprising user edits of the low resolution version of the digital video. In one or more embodiments, receiving the first workflow involves receiving a data file including information associated with editing the digital video. For example, receiving the first workflow can involve receiving a data file including one or more user selections of a plurality of selectable options presented to user 104 via a video editing interface on client device 102.

As shown in FIG. 6, method 600 further includes act 640 of receiving a low resolution render command from client device 102. For example, act 640 can involve receiving, from client device 102, a first low resolution render command. As shown in FIG. 6, method 600 further includes act 650 of generating a revised low resolution version of the digital video by rendering the user edits to the low resolution version of the digital video. For example, in response to receiving the first low resolution render command, act 640 can involve generating, at content management system 112, a revised low resolution version of the digital video by rendering, at the content management system, the user edits to the low resolution version of the digital video.

As shown in FIG. 6, method 600 further includes act 660 of synchronizing the revised low resolution version of the digital video to an account on online content management system 112. For example, act 660 can involve synchronizing the revised low resolution version of the digital video to an account of online content management system 112 associated with client device 102. In one or more embodiment, synchronizing the revised low resolution version of the digital video involves providing access to client device 102 to the revised low resolution version of the digital video via an account of user 104 with online content management system 112. Additionally, in one or more embodiments, providing the revised low resolution version of the digital video involves providing the revised low resolution version of the digital video within a web browser interface on client device 102.

As shown in FIG. 6, method 600 further includes act 670 of receiving a high resolution render command from client device 102. For example, act 670 can involve receiving, from client device 102, a high resolution render command including instructions to apply one or more user edits to a high resolution version of the digital video. As shown in FIG. 6, method 600 further includes act 680 of generating a revised high resolution version of the digital video by rendering the user edits to the high resolution version of the digital video. For example, in response to receiving the high resolution render command, act 670 can involve generating a revised high resolution version of the digital video by rendering, at content management system 112, the user edits to the high resolution version of the digital video.

In one or more embodiments, method 600 can include receiving, from client device 102, a request for a current version of the high resolution version of the digital video. In response to receiving the request for the current version of the high resolution version of the digital video, method 600 can include providing the revised high resolution version of the digital video to the client device.

Additionally, method 600 can enable user 104 to iteratively generate edits to apply to the digital video. For example, in one or more embodiments, method 600 involves receiving, from client device 102, a second workflow comprising additional edits to the first revised low resolution version of the digital video. Additionally, method 600 can involve receiving, from client device 102, a second low resolution render command. In response to receiving the second low resolution render command, method 600 can include generating, at content management system 112, the additional edits to the first revised low resolution version of the digital video. In one or more embodiments, generating the revised high resolution version of the digital video further includes rendering the additional edits to the high resolution version of the digital video. Further, in one or more embodiments, generating the revised high resolution version of the digital video is performed after receiving both the first workflow and the second workflow.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
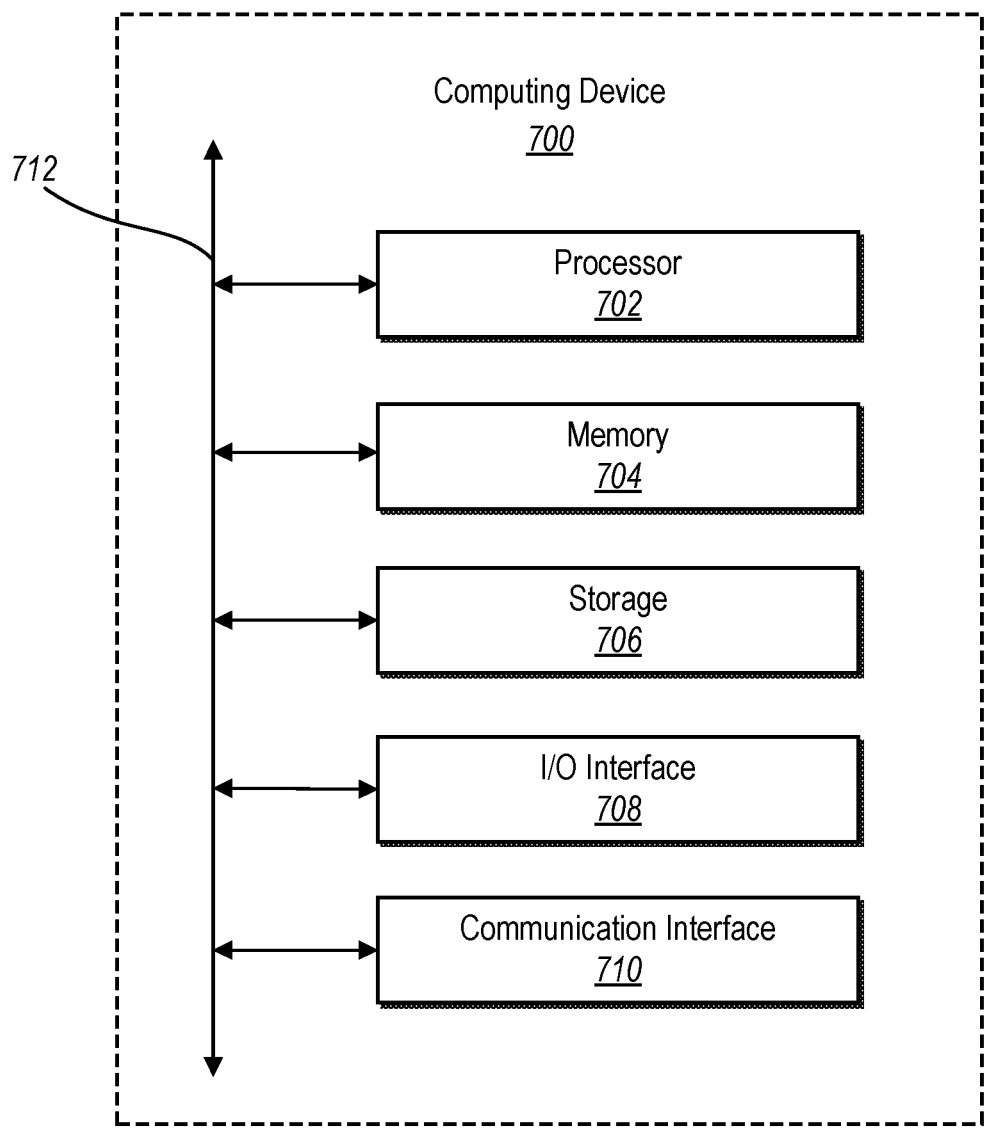
FIG. 7 illustrates a block diagram of a computing device in accordance with one or more embodiments.

FIG. 7 illustrates a block diagram of exemplary computing device 700 that may be configured to perform one or more of the processes described above. One will appreciate that client devices 102, 102a-b, and/or server device 106 may comprise one or more computing devices such as computing device 700. As shown by FIG. 7, computing device 700 can comprise processor 702, memory 704, storage device 706, I/O interface 708, and communication interface 710, which may be communicatively coupled by way of communication infrastructure 712. While an exemplary computing device 700 is shown in FIG. 7, the components illustrated in FIG. 7 are not intended to be limiting. Additional or alternative components may be used in other embodiments. Furthermore, in certain embodiments, computing device 700 can include fewer components than those shown in FIG. 7. Components of computing device 700 shown in FIG. 7 will now be described in additional detail.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage device 706 and decode and execute them. In particular embodiments, processor 702 may include one or more internal caches for data, instructions, or addresses. As an example and not by way of limitation, processor 702 may include one or more instruction caches, one or more data caches, and one or more translation lookaside buffers (TLBs). Instructions in the instruction caches may be copies of instructions in memory 704 or storage 706.

Memory 704 may be used for storing data, metadata, and programs for execution by the processor(s). Memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 704 may be internal or distributed memory.

Storage device 706 includes storage for storing data or instructions. As an example and not by way of limitation, storage device 706 can comprise a non-transitory storage medium described above. Storage device 706 may include a hard disk drive (HDD), a floppy disk drive, flash memory, an optical disc, a magneto-optical disc, magnetic tape, or a Universal Serial Bus (USB) drive or a combination of two or more of these. Storage device 706 may include removable or non-removable (or fixed) media, where appropriate. Storage device 706 may be internal or external to computing device 700. In particular embodiments, storage device 706 is non-volatile, solid-state memory. In other embodiments, Storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 708 allows a user to provide input to, receive output from, and otherwise transfer data to and receive data from computing device 700. I/O interface 708 may include a mouse, a keypad or a keyboard, a touch screen, a camera, an optical scanner, network interface, modem, other known I/O devices or a combination of such I/O interfaces. I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 708 is configured to provide graphical data to a display for presentation to a user. The graphical data may be representative of one or more graphical user interfaces and/or any other graphical content as may serve a particular implementation.

Communication interface 710 can include hardware, software, or both. In any event, communication interface 710 can provide one or more interfaces for communication (such as, for example, packet-based communication) between computing device 700 and one or more other computing devices or networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 712 may include hardware, software, or both that couples components of computing device 700 to each other. As an example and not by way of limitation, communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 8:
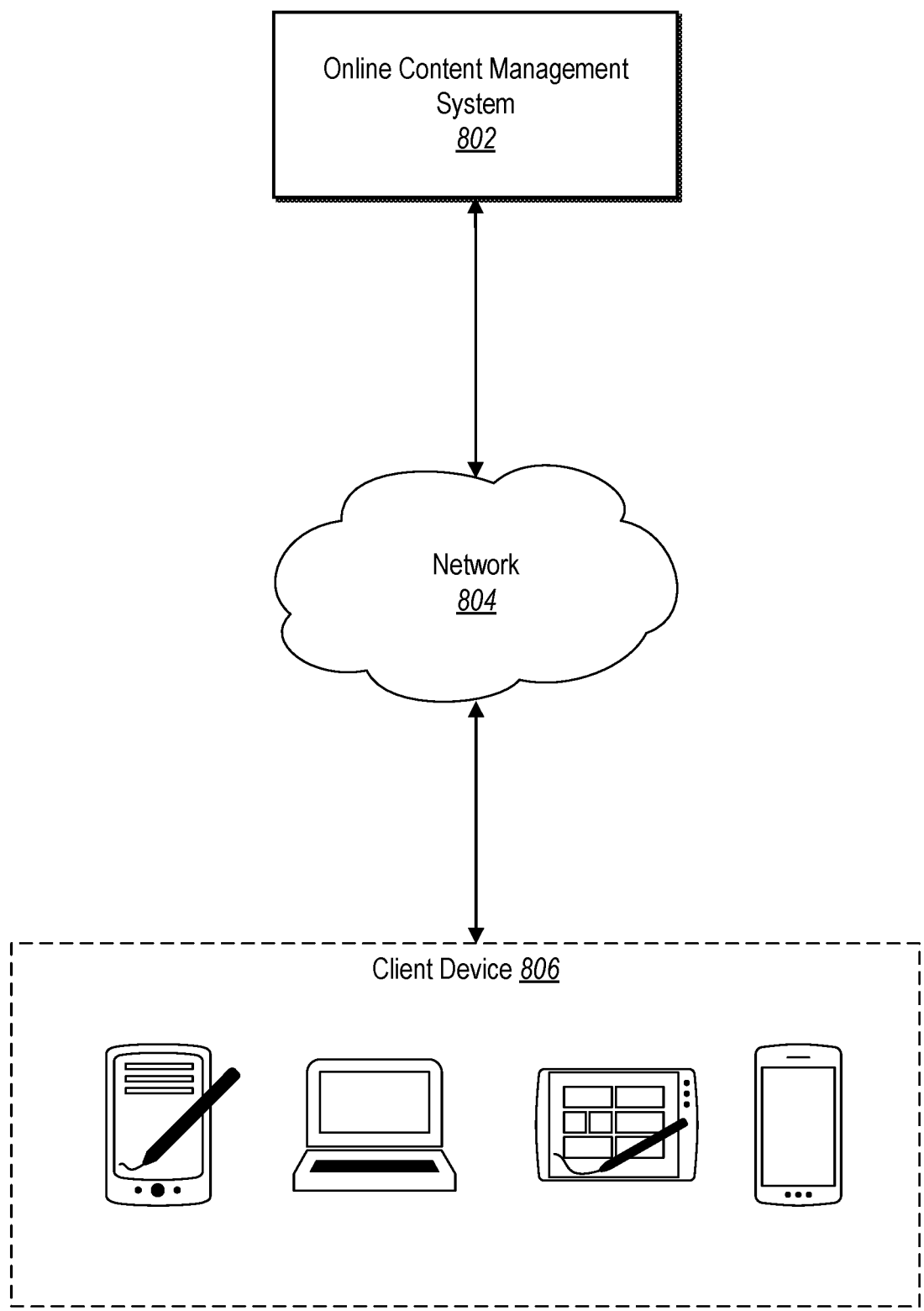
FIG. 8 illustrates a networking environment of an online content management system in accordance with one or more embodiments.

FIG. 8 is a schematic diagram illustrating an environment within which one or more embodiments of video editing systems 100, 300 can be implemented. Online content management system 802 may generate, store, manage, receive, and send digital content (such as digital videos). For example, online content management system 802 may send and receive digital content to and from client devices 806 by way of network 804. In particular, online content management system 802 can store and manage a collection of digital content. Online content management system 802 can manage the sharing of digital content between computing devices associated with a plurality of users. For instance, online content management system 802 can facilitate a user sharing a digital content with another user of online content management system 802.

In particular, online content management system 802 can manage synchronizing digital content across multiple client devices 806 associated with one or more users. For example, a user may edit digital content using client device 806. The online content management system 802 can cause client device 806 to send the edited digital content to online content management system 802. Online content management system 802 then synchronizes the edited digital content on one or more additional computing devices.

In addition to synchronizing digital content across multiple devices, one or more embodiments of online content management system 802 can provide an efficient storage option for users that have large collections of digital content. For example, online content management system 802 can store a collection of digital content on online content management system 802, while the client device 806 only stores reduced-sized versions of the digital content. A user can navigate and browse the reduced-sized versions (e.g., a thumbnail of a digital image) of the digital content on client device 806. In particular, one way in which a user can experience digital content is to browse the reduced-sized versions of the digital content on client device 806.

Another way in which a user can experience digital content is to select a reduced-size version of digital content to request the full- or high-resolution version of digital content from online content management system 802. In particular, upon a user selecting a reduced-sized version of digital content, client device 806 sends a request to online content management system 802 requesting the digital content associated with the reduced-sized version of the digital content. Online content management system 802 can respond to the request by sending the digital content to client device 806. Client device 802, upon receiving the digital content, can then present the digital content to the user. In this way, a user can have access to large collections of digital content while minimizing the amount of resources used on client device 806.

Client device 806 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 806 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 804.

Network 804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 806 may access online content management system 802.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method, comprising:
   maintaining a digital video by a content management system;
   providing, by the content management system, the digital video to a plurality of client devices in different resolutions based on a bandwidth available to each client device of the plurality of client devices;
   receiving, from the plurality of client devices, a plurality of workflows comprising user edits to the digital video in the different resolutions provided to the plurality of client devices, the user edits generated at the plurality of client devices without applying the user edits at the plurality of client devices, wherein receiving the plurality of workflows comprises:
   receiving, from a first client device, a first workflow comprising one or more user edits to a visual layer of the digital video; and
   receiving, from a second client device, a second workflow comprising one or more user edits to an audio layer of the digital video;
   generating a revised version of the digital video by applying, by the content management system, at least one user edit of the user edits from the plurality of workflows to the digital video; and
   providing, by the content management system, the revised version of the digital video to at least one client device from the plurality of client devices.

2. The method as recited in claim 1, further comprising generating at least one high resolution version of the digital video and one or more low resolution versions of the digital video, wherein maintaining the digital video by the content management system comprises maintaining the at least one high resolution version of the digital video and the one or more low resolution versions of the digital video at the content management system.

3. The method of as recited in claim 2, wherein providing the digital video to the plurality of client devices in the different resolutions comprises providing a first low resolution version of the digital video to the first client device and providing a second low resolution version of the digital video to the second client device, the second low resolution version having a different resolution than the first low resolution version.

4. The method as recited in claim 1, wherein:
   generating the revised version of the digital video by applying the at least one user edit of the user edits from the plurality of workflows to the digital video comprises applying, by the content management system, the one or more user edits to the visual layer of the digital video and the one or more user edits to the audio layer of the digital video.

5. The method as recited in claim 3, further comprising:
   receiving, from the at least one client device, a render command with respect to the at least one user edit comprising a user edit to at least one of the first low resolution version of the digital video or the second low resolution version of the digital video; and
   applying, by the content management system, the at least one user edit to the at least one high resolution version of the digital video.

6. A non-transitory computer readable storage medium storing instructions thereon that, when executed by at least one processor, cause a server device to:
   maintain, at the server device, a digital video;
   provide, by the server device, the digital video to a plurality of client devices in different resolutions based on a bandwidth available to each client device of the plurality of client devices;
   receive, from the plurality of client devices, a plurality of workflows comprising user edits to the digital video in the different resolutions provided to the plurality of client devices, the user edits generated at the plurality of client devices without applying the user edits at the plurality of client devices, wherein receiving the plurality of workflows comprises:
   receiving, from a first client device, a first workflow comprising one or more user edits to a visual layer of the digital video; and
   receiving, from a second client device, a second workflow comprising one or more user edits to an audio layer of the digital video;

generate a revised version of the digital video by applying, by the server device, at least one user edit of the user edits from the plurality of workflows to the digital video; and provide, by the server device, the revised version of the digital video to at least one client device from the plurality of client devices.

7. The non-transitory computer readable storage medium as recited in claim 6, further comprising instructions that, when executed by the at least one processor, cause the server device to generate at least one high resolution version of the digital video and one or more low resolution versions of the digital video, wherein maintaining the digital video comprises maintaining the at least one high resolution version of the digital video and the one or more low resolution versions of the digital video.

8. The non-transitory computer readable storage medium as recited in claim 7, wherein providing the digital video to the plurality of client devices in the different resolutions comprises providing a first low resolution version of the digital video to the first client device and providing a second low resolution version of the digital video to the second client device, the second low resolution version having a different resolution than the first low resolution version.

9. The non-transitory computer readable storage medium as recited in claim 6, wherein:
generating the revised version of the digital video by applying the at least one user edit of the user edits from the plurality of workflows to the digital video comprises applying, by the server device, the one or more user edits to the visual layer of the digital video and the one or more user edits to the audio layer of the digital video.

10. The non-transitory computer readable storage medium as recited in claim 8, further comprising instructions that, when executed by the at least one processor, cause the server device to:
receive, from the at least one client device, a render command with respect to the at least one user edit comprising a user edit to at least one of the first low resolution version of the digital video or the second low resolution version of the digital video; and
apply, by the server device, the at least one user edit to the at least one high resolution version of the digital video.

11. The non-transitory computer readable storage medium as recited in claim 6, wherein each workflow from the plurality of workflows comprises instructions indicating at least one portion of the digital video and at least one edit to apply to the at least one portion of the digital video.

12. The non-transitory computer readable storage medium as recited in claim 6, wherein receiving, from the plurality of client devices, the plurality of workflows comprises receiving, from a third client device, one or more user edits to an additional layer of the digital video.

13. A content management system, comprising:
at least one processor; and
a non-transitory computer readable storage medium storing instructions thereon that, when executed by the at least one processor, cause the content management system to:
maintain a digital video by the content management system;
provide, by the content management system, the digital video to a plurality of client devices in different resolutions based on a bandwidth available to each client device of the plurality of client devices;
receive, from the plurality of client devices, a plurality of workflows comprising user edits to the digital video in different resolutions based on properties associated with the plurality of client devices, the user edits generated at the plurality of client devices without applying the user edits at the plurality of client devices, wherein receiving the plurality of workflows comprises:
receiving, from a first client device, a first workflow comprising one or more user edits to a visual layer of the digital video; and
receiving, from a second client device, a second workflow comprising one or more user edits to an audio layer of the digital video;
generate a revised version of the digital video by applying, by the content management system, at least one user edit of the user edits from the plurality of workflows to the digital video; and
provide, by the content management system, the revised version of the digital video to at least one client device from the plurality of client devices.

14. The content management system as recited in claim 13, further comprising instructions that, when executed by the at least one processor, causes the content management system to generate at least one high resolution version of the digital video and one or more low resolution versions of the digital video, wherein maintaining the digital video by the content management system comprises maintaining the at least one high resolution version of the digital video and the one or more low resolution versions of the digital video at the content management system.

15. The content management system as recited in claim 14, wherein providing the digital video to the plurality of client devices in the different resolutions comprises providing a first low resolution version of the digital video to the first client device and providing a second low resolution version of the digital video to the second client device, the second low resolution version having a different resolution than the first low resolution version.

16. The content management system as recited in claim 13, wherein:
generating the revised version of the digital video by applying the at least one user edit of the user edits from the plurality of workflows to the digital video comprises applying, by the content management system, the one or more user edits to the visual layer of the digital video and the one or more user edits to the audio layer of the digital video.

17. The content management system as recited in claim 15, further comprising instructions that, when executed by the at least one processor, causes the content management system to:
receive, from the at least one client device, a render command with respect to the at least one user edit comprising a user edit to at least one of the first low resolution version of the digital video or the second low resolution version of the digital video; and
apply, by the content management system, the at least one user edit to the at least one high resolution version of the digital video.

18. The content management system as recited in claim 13, wherein receiving, from the plurality of client devices, the plurality of workflows comprises receiving, from a third client device, one or more user edits to an additional layer of the digital video.

19. The method as recited in claim 1, further comprising:
determining the bandwidth available to each client device of the plurality of client devices; and
generating versions of the digital video in the different resolutions based on the bandwidth available to each client device,
wherein providing the digital video to the plurality of client devices in the different resolutions based on the bandwidth available to each client device of the plurality of client devices comprises providing the versions of the digital video to the plurality of client devices.

20. The method as recited in claim 1, wherein receiving, from the plurality of client devices, the plurality of workflows comprises receiving, from a third client device, one or more user edits to an additional layer of the digital video.

* * * * *